United States Patent
Yamamoto

(10) Patent No.: US 6,804,880 B2
(45) Date of Patent: Oct. 19, 2004

(54) ASSEMBLY APPARATUS

(75) Inventor: Hidetoshi Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 10 days.

(21) Appl. No.: 10/126,668

(22) Filed: Apr. 22, 2002

(65) Prior Publication Data

US 2002/0157241 A1 Oct. 31, 2002

(30) Foreign Application Priority Data

| Apr. 26, 2001 | (JP) | 2001-130153 |
| Apr. 27, 2001 | (JP) | 2001-132112 |
| May 23, 2001 | (JP) | 2001-154259 |
| May 24, 2001 | (JP) | 2001-154833 |
| Jun. 14, 2001 | (JP) | 2001-180055 |
| Sep. 21, 2001 | (JP) | 2001-289341 |

(51) Int. Cl.$^7$ ............................................. B23P 19/00
(52) U.S. Cl. .................. 29/700; 29/707; 29/710; 29/711; 29/791; 29/823; 29/824; 198/395
(58) Field of Search ........................ 29/791, 822, 700, 29/706, 707, 710, 711, 823, 824; 198/341.04, 341.05, 395

(56) References Cited

U.S. PATENT DOCUMENTS

| 3,530,571 | A | * | 9/1970 | Perry ........................... 29/563 |
| 4,144,960 | A | * | 3/1979 | Scourtes ................... 198/346.1 |
| 4,435,837 | A | * | 3/1984 | Abernathy ................... 382/111 |
| 4,784,493 | A | * | 11/1988 | Turcheck et al. ........... 356/394 |
| 4,819,783 | A | * | 4/1989 | Pinyan et al. ................ 198/395 |
| 4,819,784 | A | * | 4/1989 | Sticht ........................... 198/395 |
| 4,891,879 | A | * | 1/1990 | De Lange ..................... 29/822 |
| 4,928,383 | A | * | 5/1990 | Kaczmarek et al. ........... 29/711 |
| 4,984,353 | A | * | 1/1991 | Santandrea et al. ........... 29/714 |
| 4,988,261 | A | * | 1/1991 | Blatt ........................ 414/749.1 |
| 5,152,050 | A | * | 10/1992 | Kaczmarek et al. ........... 29/711 |
| 5,168,976 | A | * | 12/1992 | Kettelson ................. 198/345.3 |
| 5,241,482 | A | * | 8/1993 | Iida et al. ..................... 700/110 |
| 5,386,621 | A | * | 2/1995 | Fluegge et al. ............... 29/705 |
| 5,437,359 | A | * | 8/1995 | Maruyama et al. ..... 198/341.04 |
| 5,671,527 | A | * | 9/1997 | Asai et al. ..................... 29/740 |
| 5,924,546 | A | * | 7/1999 | Funaya ........................ 198/395 |
| 6,279,224 | B1 | * | 8/2001 | Wirtz et al. ................... 29/711 |
| 6,353,986 | B1 | * | 3/2002 | Becherucci et al. ......... 29/401.1 |
| 6,467,158 | B1 | * | 10/2002 | Kiyomura et al. ............. 29/740 |

FOREIGN PATENT DOCUMENTS

| DE | 3228312 A1 | * | 2/1984 | .......... B65G/47/29 |
| JP | 59143811 A | * | 8/1984 | .......... B65G/35/00 |
| JP | 09124146 A | * | 5/1997 | .......... B65G/47/88 |

* cited by examiner

*Primary Examiner*—John C. Hong
*Assistant Examiner*—Essama Omgba
(74) *Attorney, Agent, or Firm*—Sughrue Mion, PLLC

(57) ABSTRACT

An assembly apparatus that may easily conform to increase in production volume and change in specifications of parts, and exhibits high production efficiency is provided. The assembly apparatus 1 includes a part-supplying station 2 in which an operator 8 supplies parts to a conveyor pallet 5, a part-assembling station 3 in which assembly robots R1, R2 assemble the parts in the conveyor pallet 5, and a conveyor means 4 that conveys the conveyor pallet 5 from the part-supplying station 2 to the part-assembling station 3. After the assembly robots R1 have finished assembling the parts on one conveyor pallet 5 in a work area A1, the conveyor means 4 conveys the one conveyor pallet 5 from the work area A1, and concurrently conveys the next conveyor pallet 5 following the one conveyor pallet 5 in the work area A1.

6 Claims, 16 Drawing Sheets

FIG.8A

|  |  | PART a | PART b | SAFETY LUG |
|---|---|---|---|---|
| DATA RECORDABLE TYPE CARTRIDGE | THRESHOLD VALUES OF UPPER LIMIT | ... | ... | 3.10(v) |
|  | THRESHOLD VALUES OF LOWER LIMIT | ... | ... | 2.70(v) |
| CLEANING-USE CARTRIDGE | THRESHOLD VALUES OF UPPER LIMIT | ... | ... | 2.50(v) |
|  | THRESHOLD VALUES OF LOWER LIMIT | ... | ... | 2.10(v) |

FIG.8B

|  | MEASUREMENTS | THRESHOLD VALUES OF UPPER LIMIT | THRESHOLD VALUES OF LOWER LIMIT |
|---|---|---|---|
| DATA RECORDABLE TYPE CARTRIDGE (t1) | 2.93(v) | 3.10(v) | 2.70(v) |
| CLEANING-USE CARTRIDGE (t2) | 2.32(v) | 2.50(v) | 2.10(v) |

ASSEMBLY APPARATUS

BACKGROUND OF THE INVENTION

This invention relates to assembly apparatuses for use in an assembly process for magnetic tape cartridges or the like that may flexibly conform to change in production volume and specifications, in which manual operations and operations using an assembly robot are combined. The present invention relates particularly to an assembly apparatus that may easily conform to increase in production volume and change in specifications of parts, and exhibits high production efficiency.

Generally, a product manufactured and sold is subject to change in production volume required in accordance with sales volume of the product. Moreover, change in specifications frequently taking place at the outset of launching a new product would entail changes in shape or the like of parts of the product at times. In this respect, a manual assembly operation is advantageous in adjustability for production volume by means of manpower relocation, and in high conformability to change in specifications. However, on the other hand, such a manual assembly operation is disadvantageously subject to human errors such as an inadvertent skip of some part to be mounted, which would produce deterioration in quality of the product. In contrast, a fully automated assembly apparatus using an assembly robot together with a part-supplying device or a part-supplying tray may advantageously serve to increase production volume, but entails enormous cost of equipment, and requires arrangement of a particular part-supplying device and part-supplying tray dedicated to each part.

Accordingly, once such a particular part-supplying device and part-supplying tray dedicated to each part are arranged in the assembly apparatus, when the part-supplying device and part-supplying tray need be replaced upon change in specifications of parts derived from new product release or the like, several months should be required to design and produce a new part-supplying device and part-supplying tray that conforms to the specifications. Moreover, parts of various specifications may be required mounting in the same location of the same type of products in response to a request from consumers or customers. In such a case, the part-supplying device and the like dedicated to each part, once equipped, would be very difficult to change in conformity to the requirements.

The inventor of the present invention has created an assembly apparatus in which an accurate and fast assembly operation using an assembly robot is combined with a manual operation having high conformability to change in specifications. This assembly apparatus includes a part-supplying station that supplies parts to a predetermined conveyor pallet through a manual operation, and a part-assembling station that assembles the parts provided in the conveyor pallet using an assembly robot. In this assembly apparatus, the parts are placed in the conveyor pallet and conveyed from the part-supplying station to the part-assembling station. The thus-constructed assembly apparatus may easily accommodate change in specifications of the parts only by a partial change in the conveyor pallet, and may prevent defective assembly due to human errors in that the assembly robot takes the parts out of the conveyor pallet and performs an assembly operation.

However, in the assembly apparatus in which a manual part-supplying operation and an assembly operation performed by the assembly robot are combined, the conveyor pallets are conveyed to the assembly robot in the following manner. First, a conveyor pallet in which parts are put is conveyed to a work area where the assembly robot performs an assembly operation. At this stage, the conveyor pallet need accurately stop at the work area so that the assembly robot may not fail to pick up the parts. For that reason, the conveyor pallet is brought into contact with a stopper pin that projects from below a conveyor means provided ahead of the conveyor pallet, for the purpose of provisional positioning of the conveyor pallet. Thereafter, two pins rise from directly below the conveyor pallet, and get fitted into predetermined holes formed on a bottom of the conveyor pallet, so that the conveyor pallet may be accurately positioned.

When the assembly robot finishes assembling parts taken out of the conveyor pallet as necessary, the stopper pin and two pins lower so as to allow the conveyor pallet to move, and the conveyor pallet is conveyed out from the work area. After the conveyor pallet is conveyed out in its entirety from the work area, the above stopper pin rises again to stop a subsequently conveyed conveyor pallet.

In a conventional arrangement as described above, a subsequent conveyor pallet is not conveyed in until a previous conveyor pallet including finished parts is conveyed out in its entirety from the work area. This would disadvantageously generate some idle time for the assembly robot to have no parts to be assembled, and lower a net serviceability ratio of the assembly robot. Such disadvantage would be made more conspicuous, as an operation speed (or line tact) becomes faster. For example, the idle time for three seconds does not matter when the operation speed is 20 seconds/unit; however, if the operation speed were made faster to seven seconds or so with increased number of the assembly robots, the idle time for three seconds would largely affect the production efficiency.

Moreover, the manual operation of supplying parts be conveyed to the assembly robot as in the above-discussed assembly apparatus would possibly entail human errors such as misorientaton of the parts. Therefore, uncorrected mounting of the misoriented parts by the assembly robot would produce a defective product, or difficulty in mounting the misoriented parts would suspend the operation of the assembly apparatus, or like troubles would be encountered. In view of these circumstances, an assembly apparatus that may securely perform an assembly operation even if the parts conveyed to the assembly robot is misoriented has been in demand.

Further, some products among those assembled using the above assembly apparatus would be required to change some components in accordance with their purposes or the like. For example, the magnetic tape cartridge includes a dedicated write-protect type, a data recordable type, a cleaning-use type, or the like, each having a safety lug in varying shapes attached thereto. In order to assemble the magnetic tape cartridges of various types as described above in one and the same assembly apparatus, different safety lugs are manually placed on the conveyor pallet according to the specifications of the target magnetic tape cartridge to be assembled. However, such a manual part-supplying operation might possibly cause a wrong part to be placed on the conveyor pallet due to human errors. Otherwise, even if the part placed were not a wrong part, the part would likely be placed in a position deviated from a predetermined position on the conveyor pallet. Further, even if the manual operation were appropriately performed, the number of the supplied parts might occasionally be different from a predetermined number. In these situations, the conventional assembly apparatus would disadvantageously produce an erroneously assembled product.

Further, in the assembly apparatus as described above in which a manual operation and an operation using an assembly robot are combined, increase in production volume may be achieved by increasing the manpower and the number of robots, and operations may be divided so that operation steps one unit of the assembly robot performs may be reduced. For example, if an arrangement in which one unit of the assembly robot performs nine assembly operations is changed into another arrangement in which three units of the assembly robots perform the same assembly operations, then these nine operations are divided so that each assembly robot may perform three assembly operations. In this arrangement, one assembly robot would perform the operations for a shorter time period, and thus the operation speed could be made faster. On the other hand, the relative time required to convey the conveyor pallet would increase. Consequently, the assembly robot could not pick up parts to be assembled from the conveyor pallet during conveyance of the conveyor pallet, with the result that a net serviceability ratio of the assembly robot would decrease; disadvantageously, the production efficiency could not be raised in proportion to the investment in equipment.

In the above assembly apparatus in which a manual operation and an operation using an assembly robot are combined, when the assembly robot fails to hold a part, or fails to mount a part, or otherwise, the following two measures are taken.

The first approach is to eliminate an abnormal work from a line of the assembly apparatus upon detection of the abnormal work, and keep the assembly apparatus performing the assembly operation without suspension. FIG. 16A depicts an operation flow of this process. It is understood that the assembly robot performing the assembly operation follows the assembly steps 1, 2, . . . , in sequence. If the assembly robot fails to assemble a work during the assembly step 2, the abnormal work is eliminated out of the system when the abnormal work is detected, and discarded or reused, while the assembly apparatus continues assembly operation without suspension. This approach never stops the assembly apparatus, and thus may advantageously make the serviceability ratio higher. On the other hand, the work that has failed to be assembled need be discarded or reassembled manually into a product. If the work is discarded, the yields of the product are reduced, and the loss in costs of the parts is not negligible especially in such an expensive product as a magnetic tape cartridge for use with a computer. If the work is manually reassembled, defect during the assembly operation is likely to occur due to human errors, so that one of the advantageous features of the assembly apparatus as described above would be lost.

The second approach is to stop the assembly apparatus immediately upon detection of the abnormal work, manually reassemble the work failed to be assembled by the assembly robot by performing the suspended step, and restart the assembly operation from a step subsequent to the suspended step. FIG. 16B depicts an operation flow of this process. For example, if the assembly robot fails to assemble a work during the assembly step 2, the assembly apparatus is suspended immediately when the abnormal work is detected. Then, the work is manually amended by properly performing the failed assembly step 2, the amended work is placed in the next assembly step 3, and the assembly apparatus is restarted. This approach may cause the yields of the product to become higher, but could possibly cause a defect in an assembled work due to human errors entailed by manual assembly operations, thus disadvantageously lowering quality of the product.

SUMMARY OF THE INVENTION

In view of the aforementioned disadvantages of various kinds, there are provided a variety of embodiments of the present invention. It is an exemplified first object of the present invention to provide an assembly apparatus that may easily conform to increase in production volume and change in specifications of parts, and exhibits high production efficiency.

An exemplified second object of the present invention is to provide an assembly apparatus that may securely perform an assembly operation by allowing an assembly robot to mount a part even if the part conveyed to the assembly robot is in a reverse orientation.

An exemplified third object of the present invention is to provide an assembly apparatus that may prevent a wrong part from being mounted.

An exemplified fourth object of the present invention is to provide an assembly apparatus in which a manual operation and an operation using an assembly robot are combined, which assembly apparatus may serve to raise production efficiency and to make a mass production possible, while saving the investment in equipment.

An exemplified fifth object of the present invention is to provide an abnormal condition handling process in an assembly apparatus in which a manual operation and an operation using an assembly robot are combined, which abnormal condition handling process may keep the yields of the product sufficiently at an adequate level, while keeping the quality of the product at an adequate level.

In order to achieve the above object, there is provided an assembly apparatus comprising a part-supplying station in which parts are supplied to a predetermined conveyor pallet through a manual operation, a part-assembling station in which the parts in the conveyor pallet are assembled through an operation using an assembly robot, and a conveyor means that conveys the conveyor pallet from the part-supplying station to the part-assembling station. In the assembly apparatus, after the assembly robot finishes assembling parts in one conveyor pallet in a work area of the assembly robot, the conveyor means conveys out the one conveyor pallet from the work area, and conveys another conveyor pallet subsequent to the one conveyor pallet into the work area at the same time.

According to the above embodiment of the present invention, conveyance of a conveyor pallet including assembled parts from the work area of the assembly robot may coincide with conveyance of the next conveyor pallet including parts to be assembled into the work area. To be more specific, the subsequent conveyor pallet immediately follows the conveyor pallet including the assembled parts, and thus, the work area would never become vacant as a result of a switching operation for the conveyor pallets, so that the assembly robot may keep operating without idle time.

An assembly apparatus as a second embodiment of the present invention includes an assembly robot that assembles parts conveyed via a conveyor means, the assembly robot being configured to perform an assembly operation, when one of the conveyed parts is placed in a reverse orientation, by correcting the reverse orientation of the part based upon a signal indicating detection of the reverse orientation of the part.

According to the second embodiment of the present invention, if a part conveyed to the assembly robot is in a reverse orientation, the assembly robot corrects the reverse orientation of the part based upon the signal indicating detection of the reverse orientation, and completes the assembly operation. This would serve to prevent the product from getting defective. Moreover, when the parts are supplied through a manual operation, an operator is allowed to supply a part in a reverse orientation, and therefore a burden on the operator is alleviated.

Further provided as a third embodiment of the present invention is an assembly apparatus that assembles parts using an assembly robot, in which the assembly robot includes a gripper portion that holds each part to be assembled, a dimensions measuring means that measures dimensions of the part held by the gripper portion, and a part-identifying means that determines whether the part is a target part to be mounted, based upon the dimensions of the part measured by the dimensions measuring means.

The above assembly apparatus according to the third embodiment of the present invention is for example such that an assembly robot holds and assembles the parts supplied on the conveyor pallet, using the gripper portion of the assembly robot. In this assembly apparatus, dimensions of the part held by the gripper portion are measured in the dimensions measuring means, and it is determined in the part-identifying means whether the part held by the gripper portion is a target part to be assembled, based upon the dimensions measured in the dimensions measuring means. If it is determined that the part held by the gripper portion is different from the target part to be assembled, then for example the assembly operation is suspended, or a warning message is issued, so that defective assembly of the parts may be prevented. Therefore, even in case where products of multiple kinds each containing parts different in size and/or in shape are assembled, particularly in cases such as where parts are manually supplied onto the conveyor pallet, assembly of a wrong part that is likely to occur because the wrong part is supplied onto the conveyor pallet or because a part is erroneously supplied into a position different from a predetermined position on the conveyor pallet may be prevented.

For instance, in an assembly apparatus including a part-supplying station, a part-assembling station, and a conveyor means such as a roller conveyor through which the part-supplying station and the part-assembling station are connected, configured to convey a conveyor pallet via the conveyor means, to supply parts onto the conveyor pallet through a manual operation in the part-supplying station, and to assemble the parts supplied onto the conveyor pallet through an operation using an assembly robot in the part-assembling station, provision of the above dimensions measuring means and the part-identifying means would serve to flexibly conform to change in kind of the product to be assembled, and to prevent erroneous assembly of parts derived from erroneous supply of parts due to human errors and mistakes in position of the supplied parts.

An assembly apparatus as a fourth embodiment of the present invention includes a part-supplying station in which parts are supplied to a predetermined conveyor pallet through a manual operation, a part-assembling station in which the parts in the conveyor pallet are assembled through an operation using an assembly robot, and a conveyor means that conveys the conveyor pallet from the part-supplying station to the part-assembling station. In this assembly apparatus, the part-assembling station includes a part-supplying means that supplies some of the parts to an assembly robot for assembling the parts, and the assembly robot receives the some of the parts from the part-supplying means during a period for which the conveyor means conveys the conveyor pallet.

Since the above assembly apparatus according to the fourth embodiment of the present invention in which an operation using an assembly robot and a manual operation are combined is provided with a part-supplying means that supplies some of the parts other than those conveyed via the conveyor pallet within a range of a hand of the assembly robot, and configured to allow the assembly robot to receive the parts from the part-supplying means during the time period for which the conveyor means conveys the conveyor pallet to replace the same with the next conveyor pallet, so that the assembly robot may continue operating even during conveyance of the conveyor pallet. As a result, when the conveyor pallet stops at a work area in front of the assembly robot, the assembly robot has already held at least one part, and thus may immediately start assembling the part without performing a part-pick-up operation. Accordingly, the assembly apparatus in this embodiment of the present invention may contribute to a continuously maintained high serviceability ratio of the assembly robot, restricted investment in equipment, increased production efficiency by using the assembly robot, and enabled bulk production.

Moreover, according to a fifth embodiment of the present invention, there is provided an abnormal condition handling process in an assembly apparatus. The assembly apparatus includes a part-supplying station in which parts are supplied to a predetermined conveyor pallet through a manual operation, a part-assembling station in which the parts in the conveyor pallet are assembled through an operation using an assembly robot, and a conveyor means that conveys the conveyor pallet from the part-supplying station to the part-assembling station. In this embodiment, when an abnormal condition in assembling the parts by the assembly robot takes place in an assembly step, the assembly apparatus is suspended, and assembly of the parts is restarted from the assembly step at which the abnormal condition has taken place.

In the assembly apparatus as above in which an operation using an assembly robot and a manual operation are combined, when the assembly robot fails to hold a part or fails to assemble a part, first, the assembly apparatus is suspended, and then the assembly robot is allowed to start with the failed step of the assembly operation again, so that the yields of the product may be increased. Further, in this embodiment, the assembly robot performs all the steps of the assembly operation, and thus the quality of the product may also be kept at high levels.

It is understood that the failed part is not necessarily reassembled immediately when the abnormal condition is encountered. Depending upon circumstances of the abnormal condition in assembly, for example, an abnormal condition that has occurred in one assembly step would cause a part that has once been mounted normally to come off; thereby the steps upstream of the failed step would become necessitated reassembling in some instances. In such instances, the assembly operation of the pertinent work is temporarily suspended, and later put into an upstream defective assembly step to be carried out again so that the work may be reassembled, in that the work could not be inserted in the failed assembly step.

Other objects and further features of the present invention will become readily apparent from the following description of preferred embodiments with reference to accompanying drawings.

BRIEF DESCRIPTION OF THE DRAWINGS

FIG. 8A is an exemplified table showing threshold voltage values of upper and lower limits for each part which are preset in a meter relay of a robot hand, and compared with voltage values output from a detector portion when a gripper portion of the robot hand holds a part.

FIG. 8B is an exemplified table showing a relationship between voltage values output from a detector portion when a gripper portion of a robot hand holds a part, and threshold values of upper and lower limits for each part which are preset in a meter relay of the robot hand.

DETAILED DESCRIPTION OF THE PREFERRED EMBODIMENTS

A detailed description will be given of the preferred embodiments of the present invention, with reference made to the drawings as appropriate.

[First Embodiment]

Figure 1:
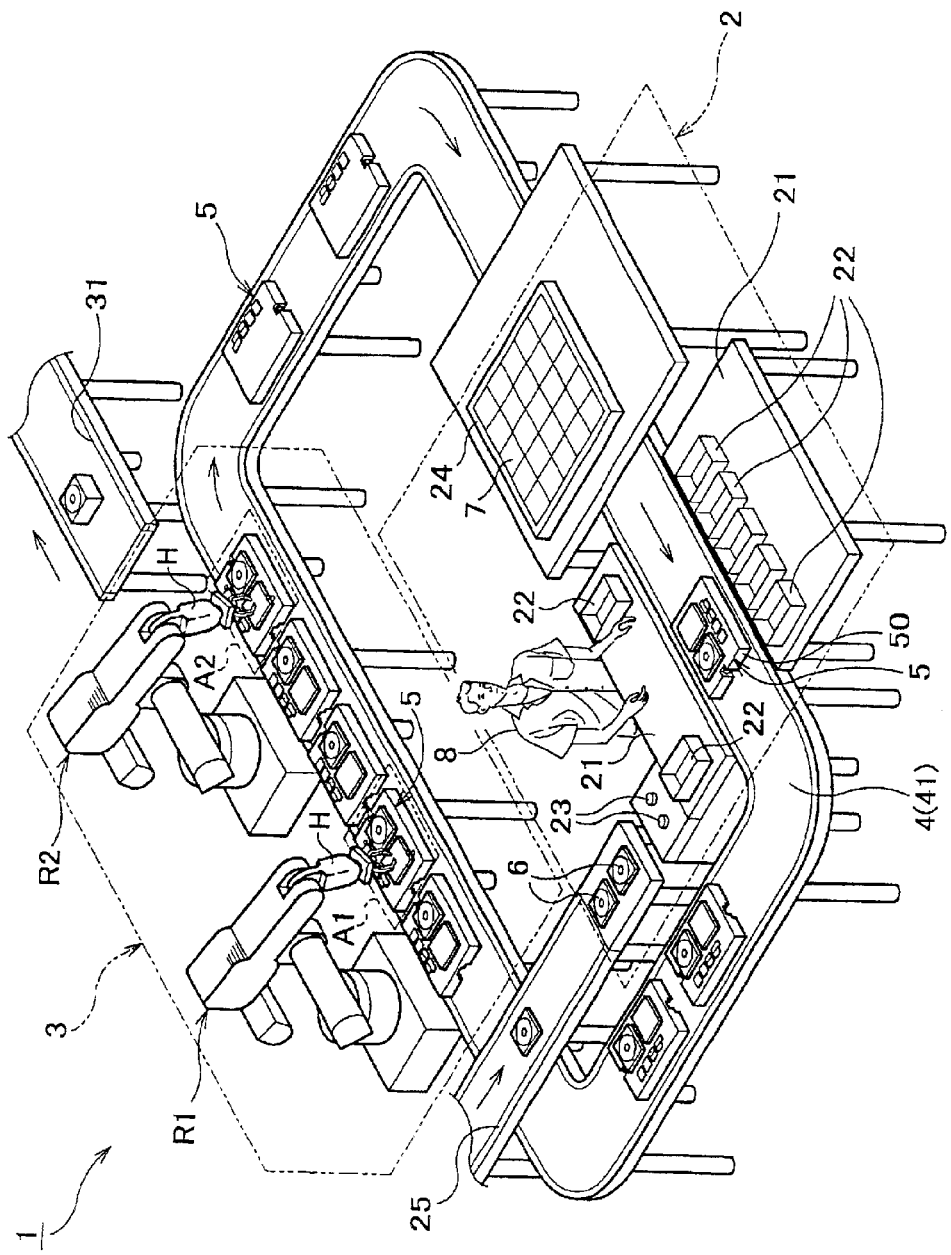
FIG. 1 is a perspective view showing a general arrangement of an assembly apparatus according to the present invention.
Figure 2:
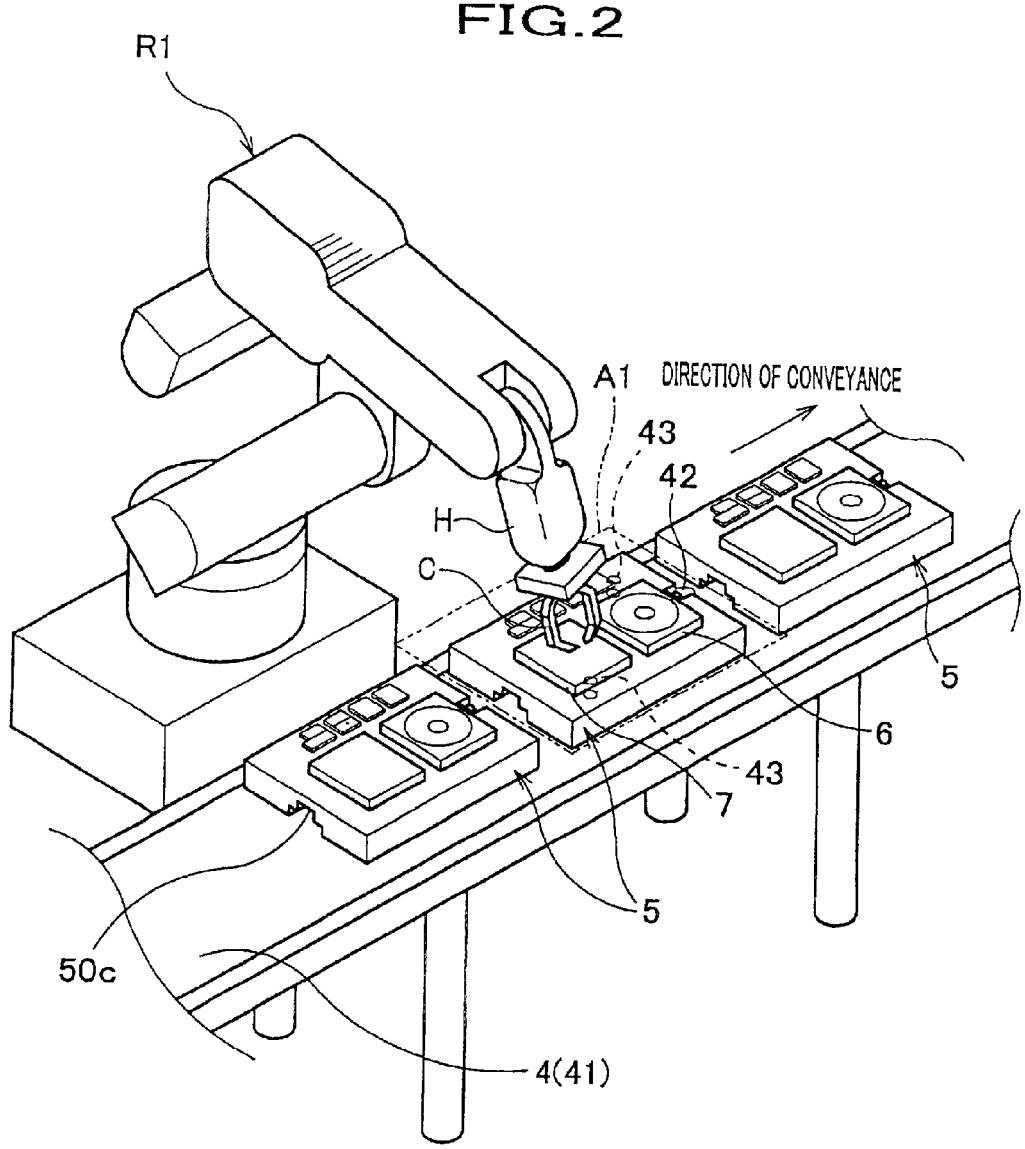
FIG. 2 is a partially enlarged perspective view of a part-assembling station.

FIG. 1 is a perspective view showing a general arrangement of an assembly apparatus according to a first embodiment of the present invention. FIG. 2 is a partially enlarged perspective view of a part-assembling station of the assembly apparatus according to the first embodiment of the present invention.

As shown in FIG. 1, the assembly apparatus 1 is comprised of an assembly line in a loop, and connected with a part-supplying station 2 and a part-assembling station 3 via a conveyor means 4 such as a roller conveyor 41. When the assembly apparatus 1 is used to assemble a work of a magnetic tape cartridge or the like, an operator performs a part-supplying operation in the part-supplying station 2, and an assembly robot serves to perform an assembly operation in the part-assembling station 3. It is understood that the operations are divided into two portions: some appropriate for a human operator; and others appropriate for an assembly robot.

In the part-supplying station 2, all the parts of one work are set respectively in a predetermined position on a conveyor pallet 5. The conveyor pallet 5 is conveyed to the part-assembling station 3 via the conveyor means 4, and the assembly robots R1, R2 assemble each part on the conveyor pallet 5. To take an instance in which the work is a magnetic tape cartridge, some of seven small parts are mounted by the assembly robot R1 in a lower half in which a reel is set; the rest of the parts is mounted and then an upper half is combined by the assembly robot R2.

Figure 3:
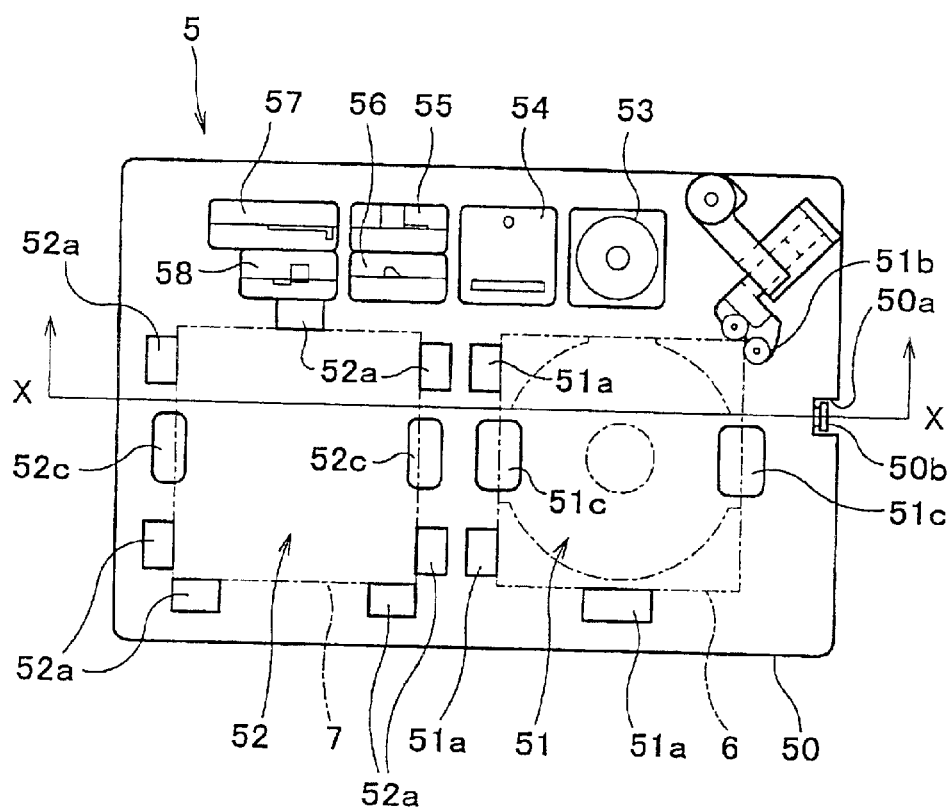
FIG. 3 is a plan view of a conveyor pallet shown in FIG. 1.

FIG. 3 is a plan view of the conveyor pallet 5. The conveyor pallet 5 that carries the parts of the work includes, as shown in FIG. 3, a base plate 50, and provided thereon are a first carriage portion 51 that carries a lower half 6 as a main component with its opening side up, a second carriage portion 52 that carries an upper half 7 with its opening side down, third through eighth carriage portions 53–58 that carry small internal parts to be mounted inside (not shown). One of the third through eighth carriage portions 53–58 carries two parts, and thus total seven internal parts may be carried. The first carriage portion 51 includes three positioning blocks 51a for positioning two adjacent sidewalls of the lower half 6, and a pressing member 51b for pressing a corner of the lower half 6 toward the positioning blocks 51a by the action of a built-in spring. At positions corresponding to two opposite sides of the lower half 6 are formed recesses 51c into which the assembly robots R1, R2 may enter gripper portions of a robot hand to pick up the lower half 6. The second carriage portion 52 includes seven positioning blocks 52a for positioning four sidewalls of the upper half 7. Like the recesses 51c, at positions corresponding two opposite sides of the upper half 7 are formed recesses 52c. Further provided is a jig having projections and depressions to hold each internal part in the third through eighth carriage portions 53–58, which jig is detachably attached to the base plate 50.

Figure 4:
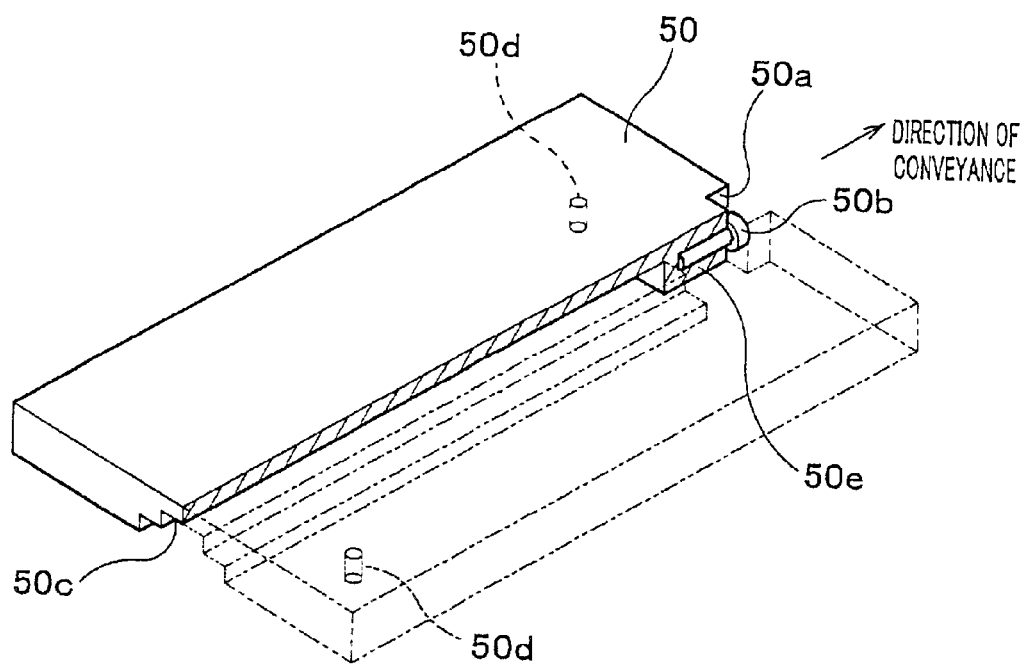
FIG. 4 is a perspective view of a base plate as viewed from a cross section taken along a line X—X in FIG. 3.

FIG. 4 is a perspective view of the base plate 50 as viewed from a cross section taken along a line X—X in FIG. 3. As shown in FIG. 4, the base plate 50 is made of a metal plate with moderate thickness throughout its entire length and width. In a midsection of a front end of the base plate 50 facing a direction in which the base plate 50 is conveyed (direction of conveyance), a notch 50a is provided to receive a stopper that serves to stop the base plate 50 conveyed to the assembly robot as will be described later. A shock-absorbing member 50b to damp an impact caused upon contact with the stopper is attached to the inside of the notch 50a facing the direction of conveyance. In a midsection of the bottom of the base plate 50, a clearance groove 50c extending in the direction of conveyance is formed so that the stopper projecting from below the base plate 50 may not interfere with the conveyance of the conveyor pallet 5. Moreover, in order to accurately position the conveyor pallet 5, positioning holes 50d in which positioning pins may be fitted as will be described later are formed at two spots in the bottom of the base plate 50. It is understood that the clearance groove 50c may be formed from a shock-absorbing member support portion 50e that supports the shock-absorbing member 50b throughout to the rear end.

The part-supplying station 2 is, as shown in FIG. 1, provided in front of an operator 8 with a roller conveyor 41 that has the conveyor pallet 5 placed thereon and conveyed sideways, with workbenches 21 placed at nearer and farther sides of the roller conveyor 41. On the workbenches 21, parts boxes 22 for storing each internal part are provided, with five placed on the farther-side workbench 21, two placed at right- and left-hand sides on the nearer-side workbench 21. An operation switch 23 for the roller conveyor 41 is provided at the right front of the operator 8. There is a container 24 containing upper halves 7 conveyed and placed at the left-hand side of the operator 8 above the roller conveyor 41; there are lower halves 6 each including a reel conveyed and placed via a supplying conveyor 25 at the right-hand side of an opposite operator 8. In locations where the parts are placed, forget-to-take sensors (not shown) are disposed to detect an operation of taking out parts, so that a warning is displayed and an alarm is activated when the operator 8 forgets to take any parts.

Although only one operator 8 supplies each part to the conveyor pallet 5 in FIG. 1, an increased number of operators 8 may be located in accordance with the production volume. The operations may be divided for each internal part and shared among the operators 8, so that an operation speed is increased. The operator 8 performs operations inside the loop of the roller conveyor 41, but may perform the operations outside the loop thereof. Moreover, the lower halves 6 need not be conveyed via the supplying conveyor 25, but may be timely carried in a part basket to a table provided near the operator 8.

The part-assembling station 3 is installed downstream of the part-supplying station 2 along the roller conveyor 41, so that two assembly robots R1, R2 may assemble magnetic tape cartridges there. The first assembly robot R1 is programmed to mount five internal parts into the lower half 6 in the conveyor pallet that has been conveyed. The second assembly robot 2 is programmed to mount the remaining two parts, hold and lift a work assembled in the lower half 6 with the upper half 7 placed on the lower half 6, and transport the work to the conveyor 31 connected to the next step including an operation using a screwdriver, or the like.

As shown in FIG. 2, in the part-assembling station 3, a position of the conveyor pallet 5 on which the assembly robot R1 performs an assembly operation is predetermined as a work area A1 indicated by a dash-double dot line. Accordingly, the work area A1 on the roller conveyor 41 is provided with a stopper 42 that may project from below a midsection of the roller conveyor 41, to temporarily stop the conveyor pallet 5 that has been conveyed. Moreover, two positioning pins 43 designed to get fitted into the positioning holes 50d in a position where the conveyor pallet 5 temporarily stops at the stopper 42 are configured to project from below the roller conveyor 41.

The stopper 42 is required to be in a lower position only for a period of time when the shock-absorbing member support portion 50e (see FIG. 4) of the conveyor pallet 5 that is being conveyed passes by, and thus is controlled to rise into the clearance groove 50c immediately after the shock-absorbing member support portion 50e has passed.

The positioning pins 43 are controlled to rise immediately after the conveyor pallet 5 that has been conveyed is brought into contact into the stopper 42, and to move down immediately after the assembly robot R1 has finished the assembly operation.

The roller conveyor 41 is controlled to convey the conveyor pallet 5 on which the operator 8 has set the parts to the part-assembling station 3, and to simultaneously convey the conveyor pallet 5 from the work area A1 and the next conveyor pallet 5 to the work area A1. These roller conveyor 41, stopper 42, and positioning pins 43 correspond to a conveyor means as set forth in the claims. However, the stopper 42 and positioning pins 43 may be omitted as appropriate depending upon the model of the roller conveyor 41 or required positioning accuracy for the conveyor pallet 5.

Conventionally, the clearance groove 5 is not formed on the bottom of the conveyor pallet 5 (base plate 50), and thus the stopper 42 cannot rise until the conveyor pallet 5 has passed in its entirety. Therefore, the roller conveyor 41 is controlled to allow the stopper 42 to rise after the conveyor pallet 5 on which all the parts has been assembled has completely passed through from the work area A1, and then to allow the next pallet 5 to be conveyed.

The assembly robots R1, R2 are general-purpose assembly robots having multiaxial joints, and each include a distal end chuck portion C of a robot hand H that is configured to hold and position various types of parts. Once a variety of operations are programmed, the assembly robots R1, R2 may perform a variety of operations such as carrying a part of various types, changing orientation of the part, aligning the position of the part, and the like. Increase in the number of the assembly robots R1, R2 allows assembly operations of seven internal parts to be divided and shared among the assembly robots, making it possible to improve the operation speed.

The above-described assembly apparatus 1 according to the first embodiment of the present invention operates as will be described below.

First, the operator 8 sets a lower half 6, an upper half 7, and each internal part taken out of a parts box 22 in sequence on the conveyor pallet 5 that has been transported to and stopped at a predetermined position in front of the operator 8. Next, the operator 8 checks that all the parts have been set, and then pushes the operation switch 23 to let the pallet 5 go to the next step.

The conveyor pallet 5 is conveyed via the roller conveyor 41 to a position in front of the assembly robot R1 that is installed in the part-assembling station 3. Since the assembly robot R1 is performing an assembly operation of parts in a preceding conveyor pallet 5 (hereinafter referred to as "antecedent conveyor pallet 5") that has already arrived and stopped at the work area At, the above conveyor pallet 5 (hereinafter referred to as "present conveyor pallet 5") that comes late waits immediately behind the antecedent conveyor pallet 5 until the antecedent conveyor pallet 5 finishes the assembly operation. When the assembly robot R1 finishes assembling the parts on the antecedent conveyor pallet 5, the positioning pins 43 lower and retract out of the positioning holes 50d, and the antecedent conveyor pallet 5 is conveyed out from the work area A1. Concurrently with the conveyance of the antecedent conveyor pallet 5, the present conveyor pallet 5 is conveyed into the work area A1. Soon after the shock-absorbing member support portion 50e passes above the retracted stopper 42, the stopper 42 rises toward the clearance groove 50c of the present conveyor pallet 5.

The present conveyor pallet 5 follows the antecedent conveyor pallet 5, and stops upon contact with the projecting stopper 42. Simultaneously with the stop of the present conveyor pallet 5, the two positioning pins 43 rise, and enter the positioning holes 50d, so that the present conveyor pallet 5 may be accurately positioned. Thereafter, the assembly robot R1 mounts the five parts in the lower half 6. When the assembly robot R1 has finished assembling the parts, the present conveyor pallet 5, like the antecedent conveyor pallet 5, is conveyed out from the work area A, and goes to an work area A2 in front of the assembly robot R2. Similarly, in the work area A2 of the assembly robot R2, the present conveyor pallet 5 comes in at the same time when the precedent conveyor pallet 5 gets out from the work area A2; then, the present conveyor pallet 5 is stopped at the work area A2 by the positioning pin 43. The assembly robot R2 mounts the remaining two parts from the present conveyor pallet 5 in the lower half 6, and holds and lifts the work assembled with the lower half 6 from the conveyor pallet 5 with the upper half 7 covering the lower half 6, to move the work to the conveyor 31 connected to the next step. The present conveyor pallet 5 in which every part has been assembled by the assembly robot R2 is conveyed along the roller conveyor 41 shaped like a loop, and stops before the operator 8 again, to be reused for assembly operation of the next magnetic tape cartridge.

As described above, the assembly apparatus according to the present embodiment operates in such a manner that the work areas A1, A2 of the assembly robots R1, R2 may always have the conveyor pallets 5, and thus may save idle time without the conveyor pallet 5. Consequently, the net serviceability ratio of the assembly robots R1, R2 may be improved, so that demand for increase in production volume would not necessarily require ineffective increase in the number of assembly robots, but could be met with minimum cost incurred.

Although the first preferred embodiment of the present invention has been described above, the present invention is not limited to the aforementioned embodiment. For example, the number of the assembly robots R1, R2 and the operators 8 arranged in the assembly line may be increased. The shorter the operation time of each assembly robot becomes, the greater would the ratio of time required to replace the conveyor pallets become, with the result that the advantageous effect of the present invention would conspicuously shows up.

Moreover, the stopper 42 and positioning pins 43 may not necessarily be configured to project from below the conveyor pallet 5; for example, the pins or the like may be configured to project from a lateral direction. In this configuration, for instance, the front end portion of the conveyor pallet 5 may only be formed wider, so that the stopper may be allowed to laterally project while the precedent conveyor pallet 5 is being conveyed out of the work area.

Further, since the operations are normally divided almost evenly for both of the assembly robot R1 and the assembly robot R2, the conveyor pallets 5 may be placed with minimum gaps spaced therebetween on the roller conveyor 41, and may all be conveyed in unison.

[Second Embodiment]

Next, a second embodiment of the present invention will be described below. Substantially the same components as in the first embodiment are designated by the same reference numerals and a detailed description thereof will be omitted.

As shown in FIG. 2, the above-described assembly robot R1 is a general-purpose assembly robot having a multiaxial joint, and a chuck portion C at a distal end of a robot hand H thereof is designed to 'pinch', 'sandwich', 'grip', 'open' and perform other operations, so as to hold various kinds of parts. The chuck portion C is designed to pivot about a shaft of the robot hand H so that the orientation of the part that has been held may be reversed. The first assembly robot R1 is programmed to perform various operations for mounting a plurality of parts so as to hold each part of various kind, change an orientation thereof, and move that part to a predetermined position. The second assembly robot R2 is configured in the same manner as the first assembly robot R1. If the production volume of the magnetic tape as a product increases, the assembly robots installed may be increased in number, and the assembly operations of parts are shared among the assembly robots, so that the operation speed may be improved.

The above roller conveyor 41 is, as shown in FIG. 1, configured to circulate the conveyor pallets 5 by conveying each conveyor pallet 5 on which each component of the magnetic cartridge is set respectively in a predetermined position by the operator 8 from the part-supplying station 2 to the part-assembling station 3 in sequence, and conveying the conveyor pallet 5 that has become vacant after completion of assembly operations of each component to the part-supplying station 2 in sequence. The roller conveyor 41 is so controlled that while the conveyor pallet 5 on which the assembly robot R1 has finished assembling the parts in the work area A1 before the assembly robot R1 is conveyed out, the next conveyor pallet 5 is conveyed into the work area A1 at the same time. Similarly, while the conveyor pallet 5 on which the assembly robot R2 has finished assembling the parts in the work area A2 before the assembly robot R2 is conveyed out, the next conveyor pallet 5 is conveyed into the work area A2 at the same time.

In the work area A1 of the above-described roller conveyor 41, as shown in FIG. 2, is provided a stopper 42 that is brought into contact with the shock-absorbing member 50b (see FIG. 4) at the front end of the conveyor pallet 5 to stop the conveyor pallet 5. The stopper 42 is controlled to retract from the conveying surface of the roller conveyor 41 only while the shock-absorbing support member 50e at the front end of the conveyor pallet 5 conveyed out is passing through, and to project into the clearance groove 50c of the base plate 50 immediately after the conveyor pallet 5 has passed off so as to stop the next conveyor pallet 5. In the work area A1 are provided positioning pins 43, 43 that are fitted into positioning holes 50d, 50d (see FIG. 4) to appropriately position in the work area A1 the conveyor pallet 5 that has stopped in contact with the stopper 42. The positioning pins 43, 43 is controlled to project from the conveying surface of the roller conveyor 41 immediately after the conveyor pallet 5 has stopped by the stopper 42, and to retract into the conveying surface of the roller conveyor 41 before retraction of the above stopper 42 when the conveyor pallet 5 is conveyed out of the work area A1.

In the assembly apparatus 1 as shown in FIG. 1 is provided, though not illustrated, a sensor for detecting whether each part in the conveyor pallet 5 conveyed toward the assembly robot R1, R2 is in a normal orientation or in a reverse orientation. The sensor is composed of an image sensor including a CCD camera or the like provided for example above the work area A1 of the roller conveyor 41 located before the first assembly robot R1 to detect according to a control flow shown in FIG. 5 whether a specific part, e.g., the lower half 6, among parts on the conveyor pallet 5 stopping at the work area A1 is placed in a laterally (or vertically) reverse orientation. If the lower half 6 is placed in a laterally reverse orientation, the first assembly robot R1 is programmed to perform an assembly operation of the magnetic tape cartridge while correcting the orientation of the lower half 6 based upon a detection signal transmitted from the sensor, as shown in the control flow in FIG. 6.

In the assembly apparatus 1 as thus constructed according to the second embodiment, the operator 8 located in the part-supplying station 2 as shown in FIG. 1 operates the operation switch 23 to stop each conveyor pallet 5 circulated by the roller conveyor 41 from the part-assembling station 3 together with the roller conveyor 41. The operator 8 sets or supplies the lower half 6, upper half 7, and other internal components of the magnetic tape cartridge respectively in a predetermined position on each conveyor pallet 5 in sequence. Thereafter, the operator 8 operates the operation switch 23 to convey the conveyor pallet 5 on which every component of the magnetic tape cartridge is set to the part-assembling station 3 in sequence, and to stop the conveyor pallet 5 containing no component that is newly conveyed from the part-supplying station 2, so that the lower half 6, upper half 7, and other internal components of the magnetic tape cartridge may each be set or supplied again in a predetermined position on the conveyor pallet 5 in sequence. During the part-supplying operation, the operator 8, who picks up the lower halves 6 one by one each conveyed by the supplying conveyor 25 in sequence to set each lower half 6 in the first carriage portion 51 of the conveyor pallet 5, may be allowed to erroneously set the lower half 6 in laterally (or vertically) wrong orientation.

Each conveyor pallet 5 conveyed in sequence by the roller conveyor 41 to the part-assembling station 3 stops at the work area A1 in front of the first assembly robot R1, as the shock-absorbing member 50b (see FIG. 3) is brought into contact with the stopper 42 projecting from the conveying surface of the roller conveyor 41, as shown in FIG. 4. Thereafter, the conveyor pallet 5 is appropriately positioned in the work area A1, as the positioning pins 43, 43 projecting from the conveying surface of the roller conveyor 41 is fitted into the positioning holes 50d, 50d (see FIGS. 2 and 4).

Figure 5:
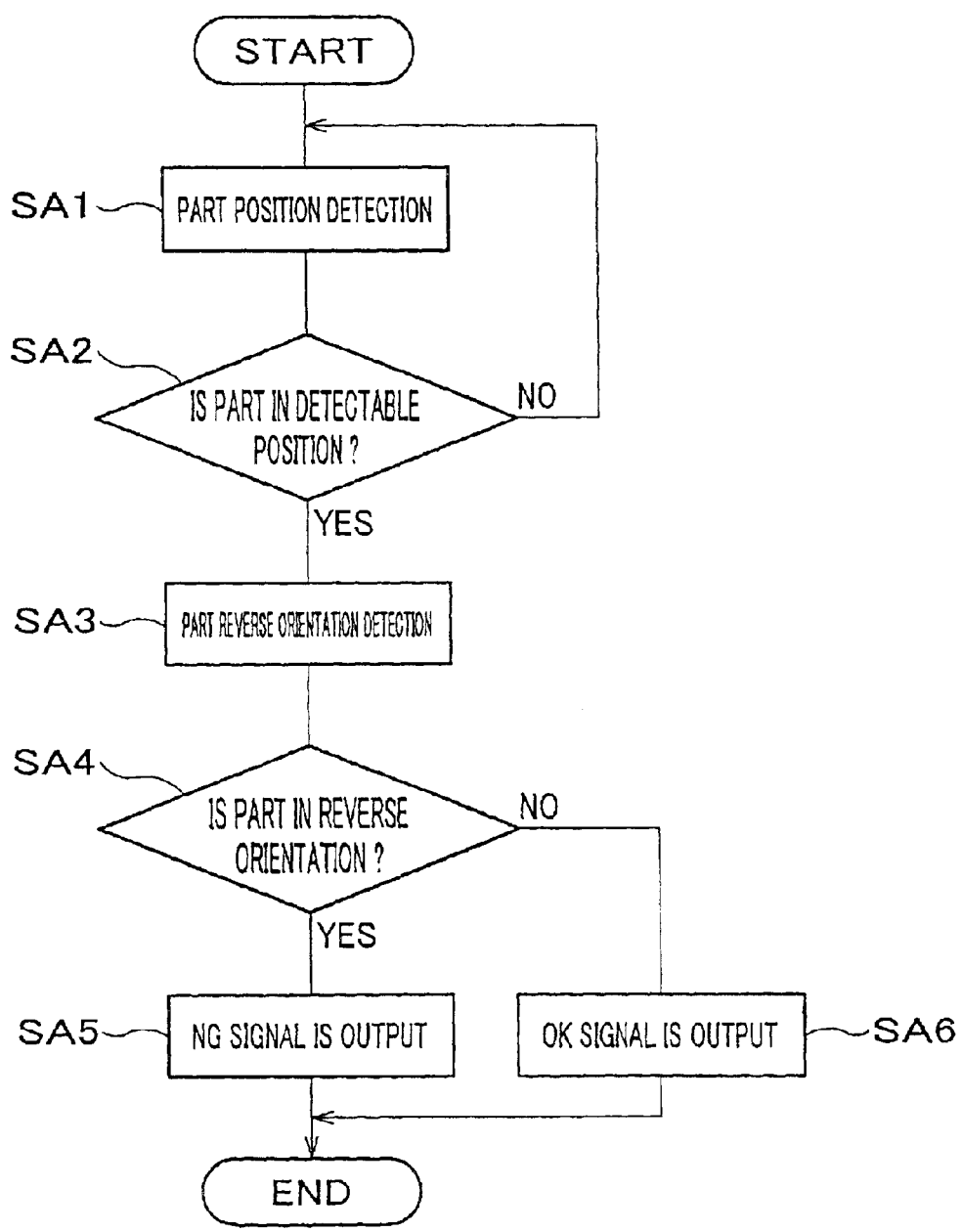
FIG. 5 is a control flowchart of an operation for detecting an orientation of a part conveyed to a first assembly robot as shown in FIG. 1.

At this stage, when the conveyor pallet 5 is positioned in the work area A1 in front of the first assembly robot R1, the image sensor composed of a CCD camera, or the like (not shown) provided above the work area A1 detects according to the control flow as shown in FIG. 5 whether the lower half 6 placed on the conveyor pallet 5 is in a laterally (or vertically) reverse orientation.

In the control flow shown in FIG. 5, first, the image sensor inputs an image of the lower half 6 on the conveyor pallet 5 for a predetermined period of time in step SA1 as a part position detection step, and it is determined based upon the image signal whether the lower half as a part is in a detectable position (SA2). If the determination results in NO in step SA2. it is presumed that the conveyor pallet 5 is not appropriately positioned in the work area A1, and thus the process returns to step SA1, while if the determination results in YES, the image sensor inputs an image of the lower half 6 for a predetermined period of time again in step SA3 as a part reverse orientation detection step, and it is determined based upon the determination result whether the lower half 6 as a part is in a reverse orientation (SA4). If the step SA4 results in YES, it is presumed that the lower half 6 as a part is in a laterally (or vertically) reverse orientation, and thus an NG signal is output (SA5), while if the determination results in NO, it is presumed that the lower half 6 as a part is in a normal orientation, and thus an OK signal is output (SA6).

Figure 6:
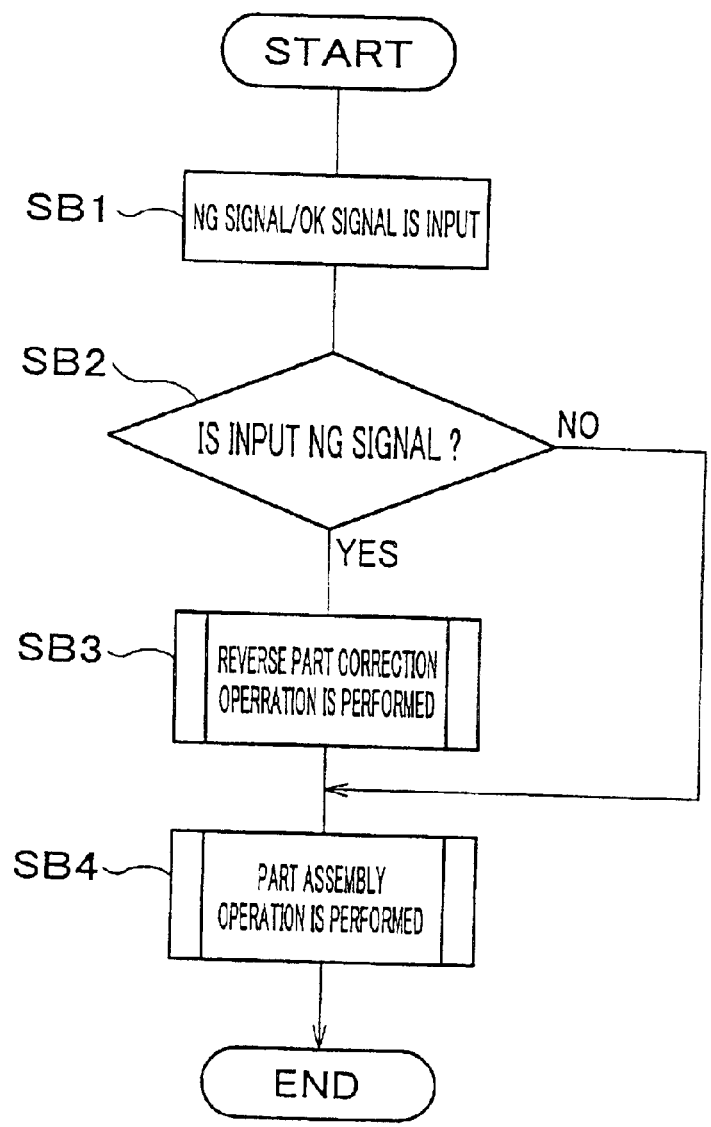
FIG. 6 is a control flowchart for illustrating an assembly operation of the first assembly robot shown in FIG. 1.

After the conveyor pallet 5 is appropriately positioned in the work area A1, the first assembly robot R1 is controlled to operate according to the control flow as shown in FIG. 6. In the control flow shown in FIG. 6, first, the NG signal or OK signal as output in the control flow in FIG. 5 is input (SB1), and it is determined whether the input signal is the NG signal (SB2). If the determination results in YES in step SB2, it is determined that the lower half 6 as a part is in a laterally (or vertically) reverse orientation, and thus the first assembly robot R1 is instructed to perform a reverse part correction operation (SB3). If the determination results in NO, it is determined that the lower half 6 as a part is in a normal orientation, and thus the process goes to step SB4 to instruct the first assembly robot R1 to perform a normal part-assembling operation. To be more specific, if the lower half 6 on the conveyor pallet 5 is in a laterally (or vertically) reverse orientation, the first assembly robot R1 is instructed to operate the chuck portion C to pick up the lower half 6 from the first carriage portion 51 of the conveyor pallet 5, to laterally (or vertically) reverse the orientation of the lower half 6, and then to put the lower half in the first carriage portion 51 in accordance with the control flow as shown in FIG. 6. Consequently, after the reverse part correction operation is complete, the first assembly robot R1 performs a normal part-assembling operation steps of holding predetermined five internal components by the chuck portion C and mounting the components in the lower half 6 on the conveyor pallet 5 in sequence.

After the first assembly robot R1 mounts the predetermined five internal components in the lower half 6, the conveyor pallet 5 is conveyed to the work area A2 in front of the second assembly robot R2, and appropriately positioned in the work area A2 in sequence. When the conveyor pallet 5 is positioned in the work area A2, the second assembly robot R2 mounts the remaining two internal components placed on the conveyor pallet 5 into the lower half 6, thereafter puts the upper half 7 over the lower half 6, takes the both out of the conveyor pallet 5, places the same on the conveyor 31, and conveys the same to the next step including an operation using a screwdriver, etc. As described above, each component of the magnetic tape cartridge set respectively in a predetermined position on the conveyor pallet 5 by the operator 8 is assembled into the magnetic tape cartridge by the assembly robots R1, R2.

According to the second embodiment of the assembly apparatus 1, as described above, if the lower half 6 conveyed toward the first assembly robot R1 is in a laterally (or vertically) reverse orientation, the first assembly robot R1 corrects the reverse orientation of the lower half 6 according to the NG signal transmitted upon detection of the reverse orientation, and performs an assembly operation. Accordingly, the operator 8 may be allowed to erroneously set the lower half 6 into the first carriage portion 51 on the conveyor pallet 5 in a laterally (or vertically) wrong orientation, so that a work load of the operator 8 may be reduced.

In the second embodiment of the assembly apparatus 1, the image sensor such as a CCD camera, etc. is employed as a sensor for detecting an orientation of the lower half 6 conveyed toward the assembly robot R1 to determine whether the lower half 6 is in a normal orientation or in a laterally (or vertically) reverse orientation, but any sensor that may detect the orientation of the part is usable, which may include a photoelectric detector, an ultrasonic sensor, a sensor detecting interruption of airflow, a proximity switch of various kinds, or the like. Further, detection of the reverse orientation may not only be directed to the lower half 6, but also to the upper half 7, or any other internal components.

Although the operator 8 arranged in the part-supplying station 2 sets or supplies the lower half 6 in the first carriage portion 51 of the conveyor pallet 5 in the second embodiment of the assembly apparatus 1, the first assembly robot R1 may hold the lower half 6 using the chuck portion C to set the lower half 6 in the first carriage portion 51 of the conveyor pallet 5. In this case, in order to allow the chuck portion C to correct the reverse orientation of the lower half 6 immediately after the chuck portion C holds the lower half 6, preferably, the misorientation of the lower half 6 may be detected in the course of conveyance on the supplying conveyor 25.

The assembly apparatus 1 according to the present invention in which the assembly robot may correct a reverse orientation of a part to perform an assembly operation is preferably applied to such an embodiment as the second embodiment in which the part-supplying operation performed by the operator 8 and the part-assembling operation performed by the assembly robots R1, R2 are combined. However, a full-automated assembly apparatus in which the part-supplying operation is performed by another assembly robot may be practicable.

[Third Embodiment]

Next, a third embodiment of the present invention will be described below. In the third embodiment, a description will be given of an assembly apparatus that assembles a magnetic tape cartridge having a specification selected prior to the assembly operation, for example, among specifications of magnetic tape cartridges of various types such as a data recordable type and a cleaning-use type, following a predetermined process steps according to the specification of the selected type of the magnetic tape cartridge. Substantially the same components as in the first or second embodiments are designated by the same reference numerals and a detailed description thereof will be omitted.

Figure 7A:
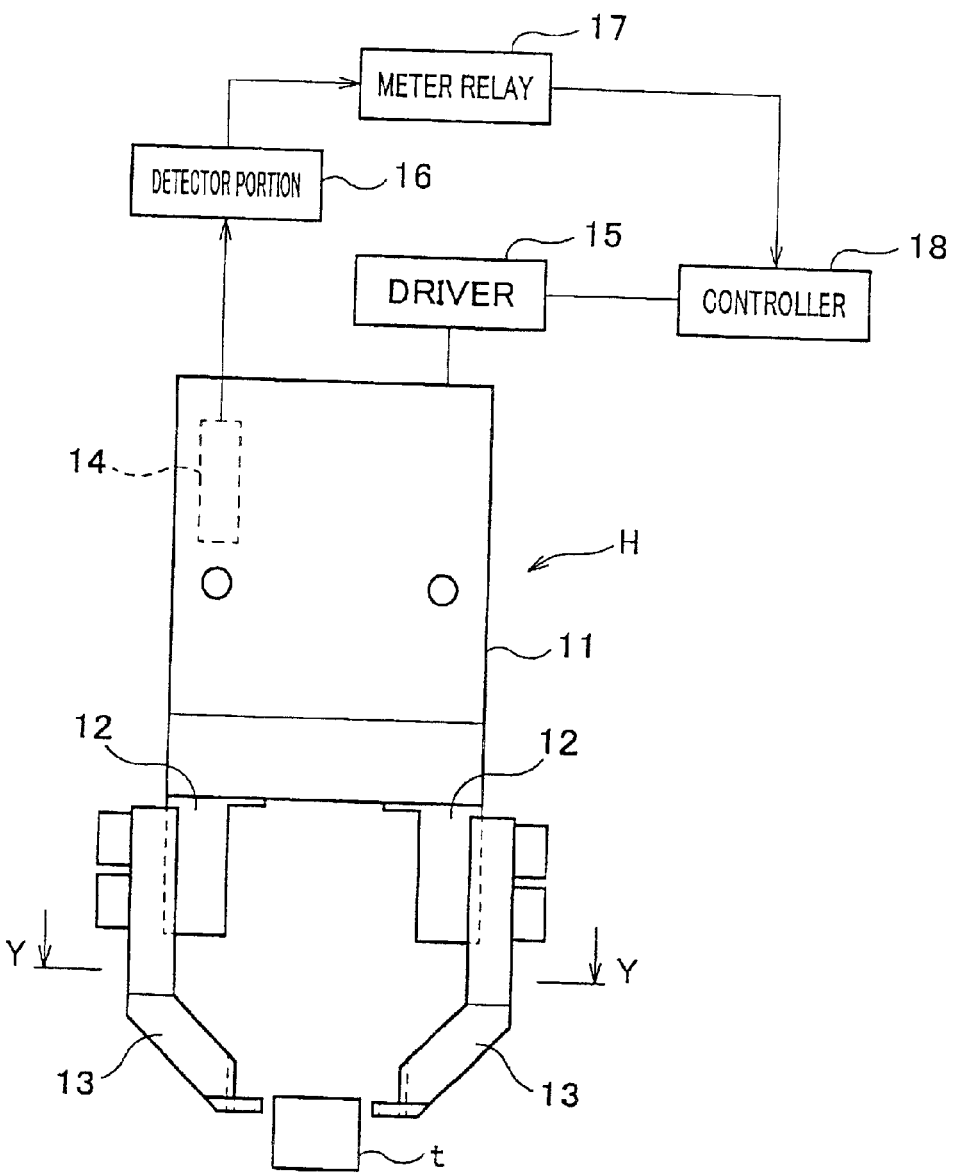
FIG. 7A is a schematic illustration of a robot hand of an assembly robot for use with an assembly apparatus.
Figure 7B:
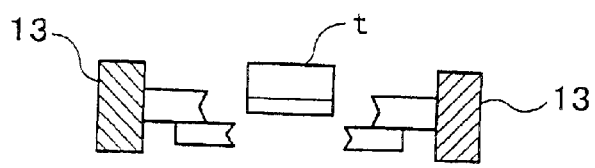
FIG. 7B is a cross-sectional view of the robot hand taken along a line Y—Y in FIG. 7A.

As shown in FIG. 7, the robot hand H provided in the assembly robots R1, R2 of the assembly apparatus 1 according to the third embodiment includes: a pair of movable portions 12 slidably provided at a distal end of a main body 11; a gripper portion (chuck portion) 13 that is attached to each movable portion 12 and performs an opening/closing operation in accordance with a sliding movement of the movable portion 12 so as to hold a part t; a driver 15 that allows a cylinder to extend and contract, and thus drives the movable portion 12 to slide; a detector portion 16 that detects an opening of the gripper portion 13; a meter relay 17 that determines based upon a detection result in the detector portion 16 whether the part held by the gripper portion 13 is a target part to be held; and a controller 18 that controls driving of the driver 15 based upon determination result in the meter relay 17.

The detector portion 16 is a dimensions measuring means that detects the opening of the gripper portion 13, and is configured to output a voltage varying according to an extending or contracting amount of the cylinder 14 that extends or contracts as the gripper portion 13 performs a holding operation.

The meter relay 17 is configured to determine based upon the voltage value output from the detector portion 16 whether the gripper portion 13 holds the part t at a predetermined opening. The meter relay 17 is also a part-identifying means for determining whether the part held by the gripper portion 13 is a target part to be held. Threshold values of upper and lower limits in a predetermined range of the voltage values for each part a, b, . . . of the magnetic tape cartridge of various types (illustrated are data recordable type and cleaning-use type only) are set in the meter relay 17, as shown in FIG. 8A. The voltage values output from the detector portion 16 during the holding operation of the gripper portion 13 are compared with the threshold values of upper and lower limits for each target part to be held in sequence from the part a, in accordance with an assembling order of the magnetic tape cartridge with a specification thereof designated prior to the assembly operation. If the voltage value output from the detector portion 16 is within the range of threshold values of upper and lower limits for the target part to be held, it is determined that the part held is the target part to be held, and if the voltage value is out of the range of the threshold values, it is determined that the part held is not the target part to be held.

Figure 9A:
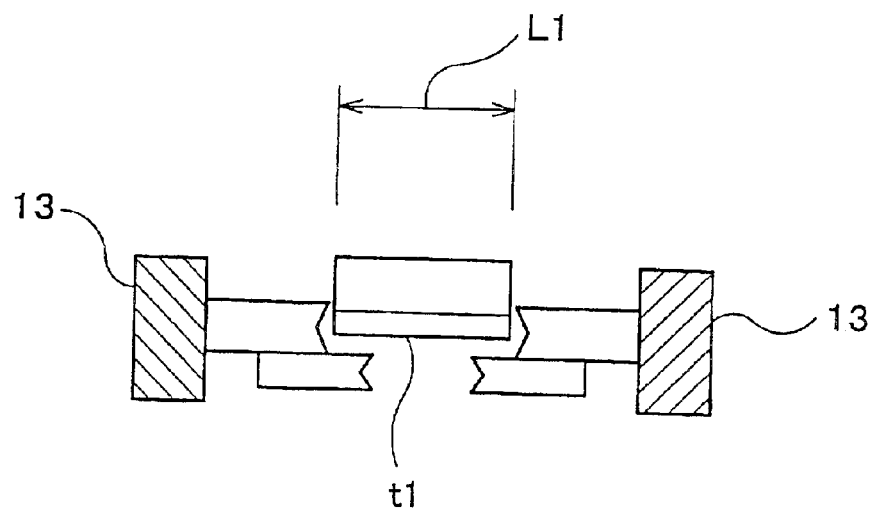
FIG. 9A shows a cross section of the robot hand taken along a line Y—Y in FIG. 7A for explaining an exemplified state in which a gripper portion of the robot hand holds a part.
Figure 9B:
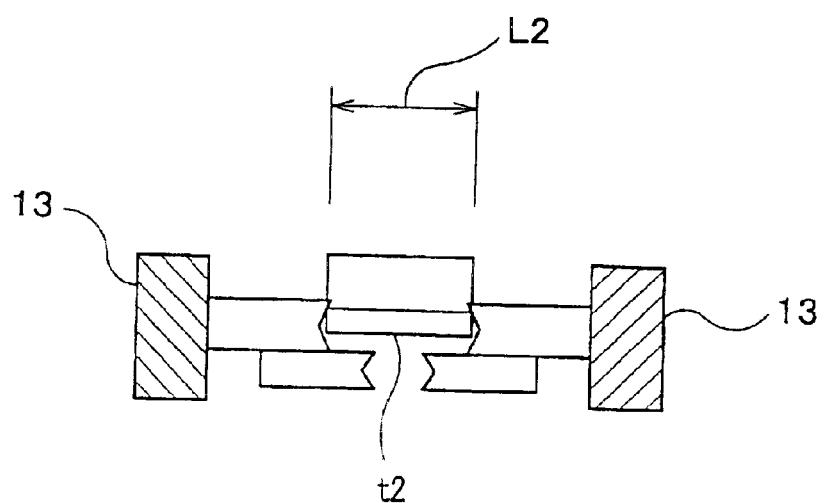
FIG. 9B is shows a cross section of the robot hand taken along a line Y—Y in FIG. 7A for explaining another exemplified state in which a gripper portion of the robot hand holds a different part.

The magnetic tape cartridge may be a data recordable type or a cleaning-use type; the shapes and sizes of the safety lug in these types vary. For example, as shown in FIGS. 9A and 9B, where the width of the safety lug t1 for the data recordable type magnetic tape cartridge is L1, and the width of the safety lug t2 for the cleaning-use type magnetic tape cartridge is L2, holding each safety lug t1, t2 would make the openings of the gripper portion 13 different by the difference between the widths of the both safety lugs L2−L1. Accordingly, the extending/contracting amount of the cylinder 14 would become different in the same proportion, and the voltage values output from the detector portion 16 would become different as well.

For example, where the width L1 of the safety lug t1 for the data recordable type magnetic tape cartridge is 18.45 mm, and the width L2 of the safety lug t2 for the cleaning-use type magnetic tape cartridge is 16.45 mm, the voltage value output from the detector portion 16 upon holding each safety lug t1, t2 are 2.93V and 2.32V respectively, as shown in FIG. 8B. Accordingly, the upper limit threshold value of 3.10V and the lower limit threshold value of 2.70V are respectively set for 2.93V as the voltage value of safety lug t1 for the data recordable type magnetic tape cartridge in the meter relay 17. On the other hand, the upper limit threshold value of 2.50V and the lower limit threshold value of 2.10V are respectively set for 2.32V as the voltage value of safety lug t2 for the data recordable type magnetic tape cartridge in the meter relay 17.

For example, when the safety lug t1 for the data recordable type magnetic tape cartridge is held, if the voltage value output from the detector portion 16 upon holding operation by the gripper portion 13 is within the range from 2.70V to 3.10V, it is determined that the part held is the safety lug t1 for the data recordable magnetic tape cartridge, and the assembly operation proceeds, while if the voltage value is out of the range, it is determined that the part held is not the safety lug t1 for the data recordable magnetic tape cartridge, and the assembly operation is suspended. On the other hand, when the safety lug t2 for the cleaning-use magnetic tape cartridge is held, if the voltage value output from the detector portion 16 upon holding operation by the gripper portion 13 is within the range from 2.10V to 2.50V, it is determined that the part held is the safety lug t2 for the data recordable magnetic tape cartridge, while if the voltage value is out of the range, it is determined that the part held is not the safety lug t2 for the data recordable magnetic tape cartridge.

The controller 18 continues the assembly operation if it is determined in the meter relay 17 that the part held t is the target part to be held, and the holding operation of the gripper portion 13 driven by the driver 15 is halted to suspend the assembly operation.

The robot hand H as thus constructed is driven by the driver 15 to extend and contract the cylinder 14, let the gripper portion 13 perform an opening/closing operation, and hold the part t using the gripper portion 13. Hereupon, in the robot hand H, the meter relay 17 determines based upon the voltage value output from the detector portion 16 whether the gripper portion 13 has held the part with a predetermined force, and the controller 18 controls driving of the driver 15 based upon the determination result.

Further, in the robot hand H, the meter relay 17 determines based upon the voltage value output from the detector portion 16 whether the part held by the gripper portion 13 is the target part to be held, and if the meter relay 17 determines that the part held is the target part to be held, the controller 18 continues to perform the assembly operation, while if the meter relay 17 determines that the part held is not the target part to be held, the controller 18 lets the gripper portion 13 stop the holding operation driven by the driver 15 to suspend the assembly operation.

It is understood that the assembly robots R1, R2 may be increased in number according to the production volume so as to share the assembling operation of the internal components, so that the operation speed may be improved.

The thus-constructed assembly apparatus 1 according to the third embodiment may be used in such a manner as will be described below.

For example, when the magnetic tape cartridge of data recordable type is assembled, first, the operator 8 sets in sequence the lower half 6, upper half 7, and internal parts constituting the data recordable type magnetic tape cartridge taken out of the parts box 22, respectively in a predetermined position on the conveyor pallet 5 that has been conveyed to the part-supplying station 2 via the roller conveyor 41 and has stopped in front of the operator 8. Next, having confirmed that all the parts have been set, the operator 8 operates the operation switch 23 to convey the conveyor pallet 5 to the next step.

The conveyor pallet 5 is conveyed, via the roller conveyor 41, to the work area A1 before the assembly robot R1 in the part-assembling station 3. The assembly robot R1 holds each part including the safety lug t1 out of the conveyor pallet 5 conveyed to the work area A1 in a predetermined sequence using the gripper portion 13 of the robot hand H, and mounts each part in the lower half 6 in the sequence.

Hereupon, the assembly robot R1 compares the voltage values output from the detector portion 16 that vary according to the opening of the gripper portion 13 of the robot hand H with the threshold values for each part preset in the meter relay 17, and determines whether the part held is the target part to be held. If the part held is the target part to be held, the assembly robot R1 continues to perform the assembly operation, while if the part held is not the target part to be held, the assembly robot R1 suspends the assembly operation.

For example, when the gripper portion 13 holds the safety lug t1 for the data recordable type magnetic tape cartridge as shown in FIG. 9A, the voltage value output from the detector portion 16 takes on 2.93V. Hereupon, the threshold values of upper and lower limits for the safety lug t1 for the data recordable type magnetic tape cartridge are 3.10V and 2.70V respectively. Accordingly, the part held exhibits a value within the range of the thresholds of upper and lower limits for the safety lug t1 for the data recordable type magnetic tape cartridge. Thus, the meter relay 17 determines that the part held by the gripper portion 13 is the safety lug t1 for the data recordable magnetic tape cartridge, and continues to perform the assembly operation. On the other hand, when the gripper portion 13 holds the safety lug t2 for the cleaning-use magnetic tape cartridge as shown in FIG. 9B that has been erroneously supplied on the conveyor pallet 5, the voltage value output from the detector portion 16 takes on 2.32V, which is out of the range of the thresholds of upper and lower limits for the safety lug t1 for the data recordable type magnetic tape cartridge. Thus, the meter relay 17 determines that the part held is not the safety lug t1 for the data recordable type magnetic tape cartridge, and suspends the assembly operation.

The assembly operation as described above is repeated for each part in the sequence of the assembly process for the target magnetic tape cartridge to be assembled, and thus the assembly of the magnetic tape cartridge may be performed. After predetermined steps of the assembly operation have been complete, the conveyor pallet 5 is conveyed, via the roller conveyor 41, to the work area A2 for the assembly robot R2.

The assembly robot R2 mounts the remaining parts from the conveyor pallet 5 in the lower half 6, puts the upper half 7 on the lower half 6, holds and lifts the upper half 7 together with the lower half 6 from the conveyor pallet 5, and moves these components onto the conveyor 31 that goes to the next step. In this case, too, the assembly robot R2, like the assembly robot R1, determines whether the part held by the gripper portion 13 is the target part to be held; if the part held t is the target part to be held, the assembly robot R2 continues the assembly operation, while if the part held t is not the part to be held, the assembly robot R2 stops performing the assembly operation.

The conveyor pallet 5 after the assembly robot R2 has finished the assembly operation is conveyed via the roller conveyor 41 shaped like a loop, and stops in front of the operator 8 again to be used for the assembly operation of the next magnetic tape cartridge. The series of these operations are repeated and thus the magnetic tape cartridges are assembled.

As described above, according to the assembly apparatus of the present invention, determination may be made upon assembling the parts whether the part held is the target part to be held, and thus if a wrong part is held, for example, the assembly operation is suspended, or a warning message is issued, or otherwise, so that the part may be prevented from being erroneously mounted. Particularly, as in the above embodiment, where products of various types with the sizes and shapes thereof varying are assembled, or where parts are manually supplied onto the conveyor pallet, or otherwise, there is an increased possibility of supplying a wrong part onto the conveyor pallet, or of supplying a part into a place different from a predetermined place on the conveyor pallet. Nonetheless, the assembly apparatus according to the present embodiment may be prevented from erroneously assembling a part due to errors in supplied parts or in positions to which parts are supplied, while conforming flexibly, promptly, and inexpensively with change in shape, or addition in specifications of the parts.

It is to be understood that the assembly apparatus according to the present invention is not limited to the construction in the third embodiment, but various modifications and changes may be made as appropriate in the present invention without departing from the spirit and scope thereof. For example, in the above embodiment, the threshold voltage values of upper and lower limits for each part constituting the magnetic tape cartridge are preset in the meter relay 17, so that comparison of the voltage value output according to the extending/contracting amount of the cylinder 14 associated with the holding operations of the gripper portion 13 with the threshold values set in the meter relay 17 enables determination as to whether or not the part held is the target part to be held. However, the dimensions of parts may be measured, for example, using an encoder attached to a servomotor for driving the gripper portion 13, or by counting the number of steps of a stepping motor.

A description has been given, as the third embodiment, of an application of the present invention to the assembly apparatus that assembles magnetic tape cartridges, but the assembly apparatus according to the present invention may be employed for assembling components of other products, and preferably applicable particularly to an assembly operation of products that have a plurality of specifications or are subject to change in shape, or an assembly operation in which parts are manually supplied. Moreover, the number or location of the parts boxes 22 placed on the workbench 21, and location of the operation switch 23 are not limited to those of the above embodiment, but may be arbitrarily changed as far as the operator 8 performing part-supplying operation may place each part on the conveyor pallet 5.

Further, the part-supplying operation onto the conveyor pallet 5 is not necessarily performed manually on the premise that the parts may be supplied onto the conveyor pallet 5 so as to flexibly conform with change in specifications of the product. For example, a part-supplying device for automatically supplying parts onto the conveyor pallet 5 may be used. Although there still remains the possibility of supplying a wrong part by the part-supplying device onto the conveyor pallet 5, or of supplying a part into a place different from a predetermined place on the conveyor pallet 5, in such instances, this assembly apparatus is configured to determine whether the part held is the target part to be held when the part on the conveyor pallet 5 is held by the gripper portion 13 of the robot hand H, and thus may be prevented from mounting a wrong part in the assembly.

In the third embodiment, the voltage value output from the detector portion 16 varying according to the extending/contracting amount of the cylinder 14 that extends or contracts to open or close the gripper portion 13 is compared with the threshold values of upper and lower limits for the target part to be held; thus, a determination is made only whether the part held is the target part to be held. However, it is conceivable that the voltage values output from the detector portion 16 are compared with the threshold values of upper and lower limits for each part, and thus the kind of each part may be identified to determine whether the part held is the target part to be held.

[Fourth Embodiment]

Next, a fourth embodiment of the present invention will be described below.

First, a description will be given of a construction of an assembly apparatus according to the fourth embodiment, with reference to FIG. 10.

Figure 10:
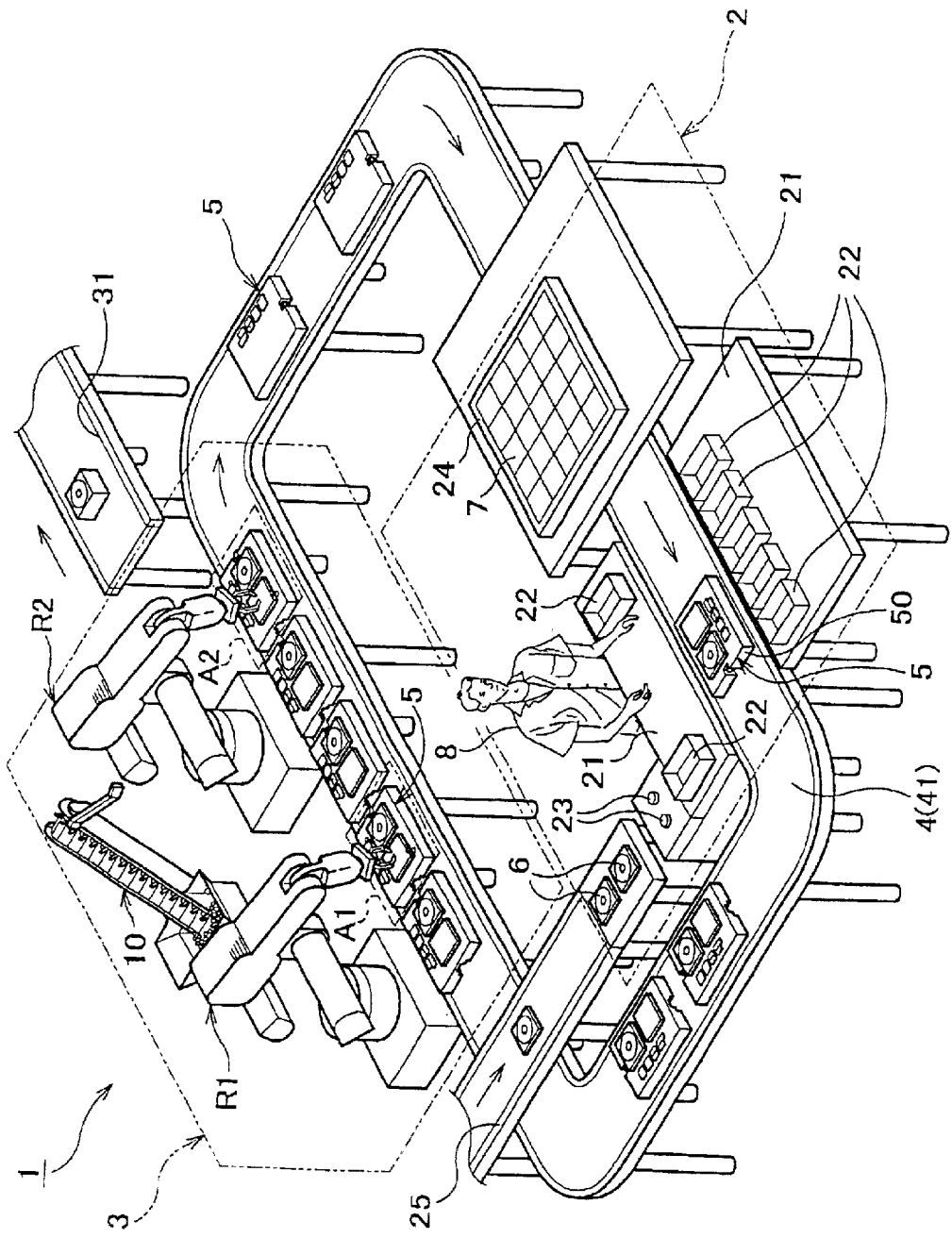
FIG. 10 is a perspective view showing a general arrangement of a fourth embodiment of an assembly apparatus according to the present invention.

As shown in FIG. 10, the assembly apparatus 1 includes an assembly line shaped like a loop, in which the part-supplying station 2 and the part-assembling station 3 are connected with each other via the conveying means such as the roller conveyor 41. In the assembly apparatus 1, for example when a work of a magnetic tape cartridge or the like is assembled, a part-supplying operation is performed manually in the part-supplying station 2, and the parts are assembled by a robot in the part-assembling station 3, so that the operations may be shared properly among human operators and robots.

The magnetic tape cartridge according to the fourth embodiment includes eight small parts, among which seven internal parts are set respectively in a predetermined position in the conveyor pallet 5 by the operator 8 in the part-supplying station 2. The conveyor pallet 5 is conveyed to the part-assembling station 3, and thus the parts are supplied to the assembly robot R1. The one remaining part is supplied from a part-supplying device 10 installed beside the assembly robot R2 in the part-assembling station 3 to the assembly robot R2. The conveyor pallet 5 is conveyed via the conveyor means 4 from the part-supplying station 2 to the part-assembling station 3, in which the assembly robots R1, R2 assemble each internal part on the conveyor pallet 5. For example, the assembly robot R1 mounts some of seven small internal parts in the lower half 6 in which a reel is set, and the assembly robot R2 mounts the remaining internal parts.

In the part-supplying station 2, the roller conveyor 41 that conveys the conveyor pallet 5 placed on the roller conveyor 41 is provided in front of the operator 8, and the workbenches 21 are provided at nearer and farther sides of the roller conveyor 41. On the workbenches 21, parts boxes 22 for storing each internal part are provided, with five placed on the farther-side workbench 21, two placed at right- and left-hand sides of the nearer-side workbench 21. An operation switch 23 for the roller conveyor 41 is provided at the right front of the operator 8. There is a container 24 containing the upper halves 7 conveyed and placed at the left-hand side of the operator 8 above the roller conveyor 41; there are lower halves 6 each including a reel conveyed and placed via a supplying conveyor 25 at the right-hand side of an opposite operator 8. In locations where the parts are placed, forget-to-take sensors (not shown) are disposed to detect an operation of taking out parts, so that a warning is displayed and an alarm is activated when the operator 8 forgets to take any parts. Although it is shown in FIG. 10 that only one operator 8 supplies each internal part to the conveyor pallet 5, an increased number of operators 8 may be located in accordance with the production volume. The operations may be divided for each internal part and shared among the operators 8, so that an operation speed is increased. The operator 8 performs operations inside the loop of the roller conveyor 41, but may perform the operations outside the loop thereof. Moreover, the lower halves 6 do not necessarily have to be conveyed via the supplying conveyor 25, but may be timely carried in a part basket to a table provided near the operator 8.

The part-assembling station 3 is installed downstream of the part-supplying station 2 along the roller conveyor 41, and the two assembly robots R1, R2 may assemble magnetic tape cartridges there. Beside the assembly robot R2, the part-supplying device 10 is installed in a position that the hand of the assembly robot R2 is reachable. The part-supplying device 10 corresponds to the part-supplying means as described in the claims.

Any device that may supply each part so accurately in a specified position that the assembly robot R2 may pick up the part may be used for the part-supplying device 10. The usable devices may include, for instance, a production-supply type supplier, a tape-hoop type automatic supplier, an automated conveyor pallet supplier, a magazine type automatic supplier, and the like. Among usable bulk supplying type suppliers are an oscillation type, rotary type, shaking type, belt type, and jet type parts feeder or the like.

The first assembly robot R1 is programmed to mount five internal parts in the lower half 6 on the conveyor pallet 5 that has been conveyed. The second assembly robot 2 is programmed to pick up one part from the part-supplying device 10 and mount the part in the lower half 6, pick up the remaining two parts from the conveyor pallet 5 and mount these parts in the lower half 6, hold and lift a work assembled in the lower half 6 with the upper half 7 placed on the lower half 6, and transport the work to the conveyor 31 connected to the next step including an operation using a screwdriver, or the like. In particular, a timing of the assembly robot R2 picking up the part from the part-supplying device 10 is programmed to be after the assembly of the internal parts on the conveyor pallet 5 has been complete, and during the time while the next conveyor pallet 5 is conveyed to the work area A2 and the preceding conveyor pallet 5 is replaced.

In the fourth embodiment, the assembly operations are divided into the step of assembling five parts performed by the assembly robot R1, and the steps of assembling three internal parts and combining the lower half 6 and the upper half 7 performed by the assembly robot R2. The share of the operations may preferably be so configured that the assembly robots R1, R2 may finish each their operations at the same time.

The assembly robots R1, R2 are general-purpose assembly robots having multiaxial joints, and include a distal end chuck portion C of a robot hand H that is configured to hold and position various types of parts. Once a variety of operations are programmed, the assembly robots R1, R2 may perform a variety of operations such as carrying a part of various types, changing orientation of the part, aligning the position of the part, and the like. Although the number of assembly robots in the assembly apparatus 1 is two in the present embodiment, the number of the assembly robots may be increased according to the production volume. Increase in the number of the assembly robots allows assembly operations of eight internal parts to be further divided and shared among the increased number of the assembly robots, making it possible to improve the operation speed.

Since the roller conveyor 41 and the conveyor pallet 5 are similar to the above-described first through third embodiments, a detailed description thereof will be omitted.

The assembly apparatus 1 constructed as above according to the fourth embodiment may be used in such a manner as will be described below.

First, the operator 8 sets a lower half 6, an upper half 7, and each internal part taken out of a parts box 22 in sequence on the conveyor pallet 5 that has been transported to and stopped at a predetermined position in front of the operator 8. Next, the operator 8 checks that all the parts have been set, and then pushes the operation switch 23 to let the pallet 5 go to the next step.

The conveyor pallet 5 is conveyed via the roller conveyor 41 to a position in front of the assembly robot R1 that is installed in the part-assembling station 3. The assembly robot R1 mounts in the lower half 6 five parts from the conveyor pallet 5 conveyed to the work area A1. When the assembly robot R1 has finished assembling as specified, the conveyor pallet 5 is conveyed via the roller conveyor 41 to the work area A2 of the assembly robot R2.

The assembly robot R2 initiates operation before the conveyor pallet 5 is conveyed to the work area A2. To be more specific, the assembly robot R2 begins operating immediately after the preceding assembly operation of the magnetic tape cartridge is complete, and holds and picks up one part from the part-supplying device 10. Preferably, the operation of the assembly robot R2 is timed opportunely so that the part from the part-supplying device 10 is held and moved to a position above the work area A2 before the next conveyor pallet 5 has been conveyed to the work area A2, i.e., in good time for the arrival of the conveyor pallet 5, allowing the prepared part to wait for the conveyer pallet 5 to be conveyed and positioned.

When the conveyor pallet 5 has stopped at the work area A2, and has got positioned, the assembly robot R2 mounts the holding part in the lower half 6, then picks up the remaining two parts from the conveyor pallet 5 and mounts the same in the lower half 6, holds and lifts a work assembled with the upper half 7 put on the lower half 6 from the conveyor pallet 5, and moves the work on to the conveyor 31 connected to the next step. The conveyor pallet 5 after the assembly robot R2 has finished assembling is conveyed onto the roller conveyor 41 shaped like a loop, and stops before the operator 8 again to be reused for an assembly operation of the next magnetic tape cartridge.

As described above, in the assembly apparatus 1 according to the fourth embodiment, even during the moments while no conveyor pallet 5 is in the work area A2 of the assembly robot R2 with the conveyor pallets 5 being conveyed in an assembly line in which the assembly robots R1, R2 and the operators 8 cooperate, the assembly robot R2 may perform an operation to obtain a part from the part-supplying device 10, and thus the assembly robot R2 may finish the assembly operation sooner in comparison with an assembly apparatus in which parts may be supplied only from the conveyor pallets 5. Consequently, the net serviceability ratio of the assembly robot R2 may be increased, and demand for increase in production volume may be satisfied without unnecessary increase in the number of assembly robots.

Although the fourth embodiment of the present invention has been described above, the present invention is not limited to the fourth embodiment. For example, the part-supplying device 10 may be configured to supply parts not only to the assembly robot R2 but also to the assembly robot R1, and if the assembly robot R2 may hold a plurality of parts, the part-supplying device 10 may supply a plurality of parts to the assembly robot R2.

[Fifth Embodiment]

Next, an abnormal condition handling process for an assembly apparatus as a fifth embodiment of the present invention will be described below.

<Arrangement of the Assembly Apparatus>

First, with reference made to FIG. 11, a description will be given of a general arrangement of the assembly apparatus 1 according to the fifth embodiment. In the arrangement of the assembly apparatus 1, the same elements as in the above first through fourth embodiments are designated by the same reference numerals, and a detailed description thereof will be omitted.

In the fifth embodiment, the magnetic tape cartridge includes eight small parts, among which seven internal parts are each set by the operator 8 in a predetermined position on the conveyor pallet 5 in the part-supplying station 2, and supplied to the assembly robots R1, R2, as the conveyor pallet 5 is conveyed via the conveyor means 4 to the part-assembling station 3. The remaining one internal part is supplied from the part-supplying device 10 installed beside the assembly robot R2 in the part-assembling station 3. The conveyor pallet 5 is conveyed via the conveyor means 4 from the part-supplying station 2 to the part-assembling station 3, in which the assembly robots R1, R2 assemble each internal part on the conveyor pallet 5. For example, the assembly robot R1 mounts some of the seven small internal parts in the lower half in which a reel has been set, and the assembly robot R2 mounts the remaining internal parts.

Figure 11:
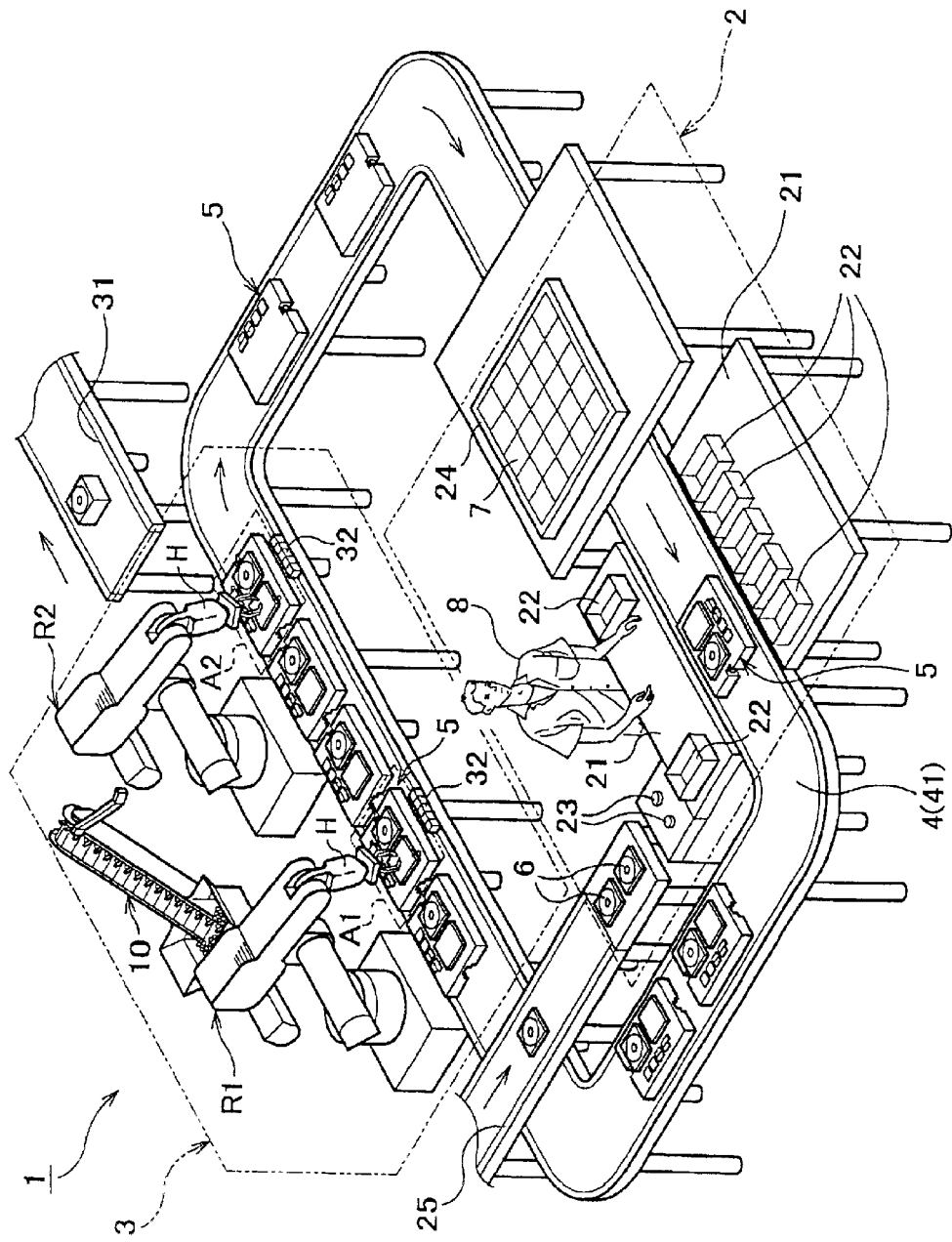
FIG. 11 is perspective view showing a general arrangement of one exemplified embodiment of an assembly apparatus to which an abnormal assembly condition handling process according to the present invention is applied.

As shown in FIG. 11, the work areas A1, A2 in which components to be assembled by the assembly robots R1, R2 are located are provided with a plurality of part sensors 32. The part sensor 32 serves to detect a position of a part placed on the conveyor pallet 5, a position of a part assembled on the conveyor pallet 5, or the like. Information detected on the position of parts is transmitted to a controller 60 (see FIG. 12) that controls the whole assembly apparatus 1 as will be described later, and if any part is out of a predetermined position, the controller 60 determines that the situation is abnormal, and stops the operation of the assembly apparatus 1.

The first assembly robot R1 is programmed in the controller 60 (see FIG. 12) to mount five internal parts in the lower half 6 on the conveyor pallet 5 that has been conveyed. The second assembly robot 2 is programmed in the controller 60 to pick up one part from the part-supplying device 10 and mount the part in the lower half 6, pick up the remaining two parts from the conveyor pallet 5 and mount these parts in the lower half 6, hold and lift a work assembled in the lower half 6 with the upper half 7 placed on the lower half 6, and transport the work to the conveyor 31 connected to the next step including an operation using a screwdriver, or the like, under the control of the controller 60. In particular, a timing of the assembly robot R2 picking up the part from the part-supplying device 10 is programmed to be after the assembly of the internal parts on the conveyor pallet 5 has been complete, and during the time while the next conveyor pallet 5 is being conveyed to the work area A2 and the preceding conveyor pallet 5 is being replaced.

Each assembly robot R1, R2 holds each part with a robot hand H thereof, and the robot hand H includes an opening sensor 33 (see FIG. 12) that detects an opening of a portion at a distal end of the robot hand H, and transmits a signal of the opening at the time of holding each part, to detect dimensions of each part and determine from the detected dimensions whether an appropriate part is held in an appropriate orientation.

Figure 12:
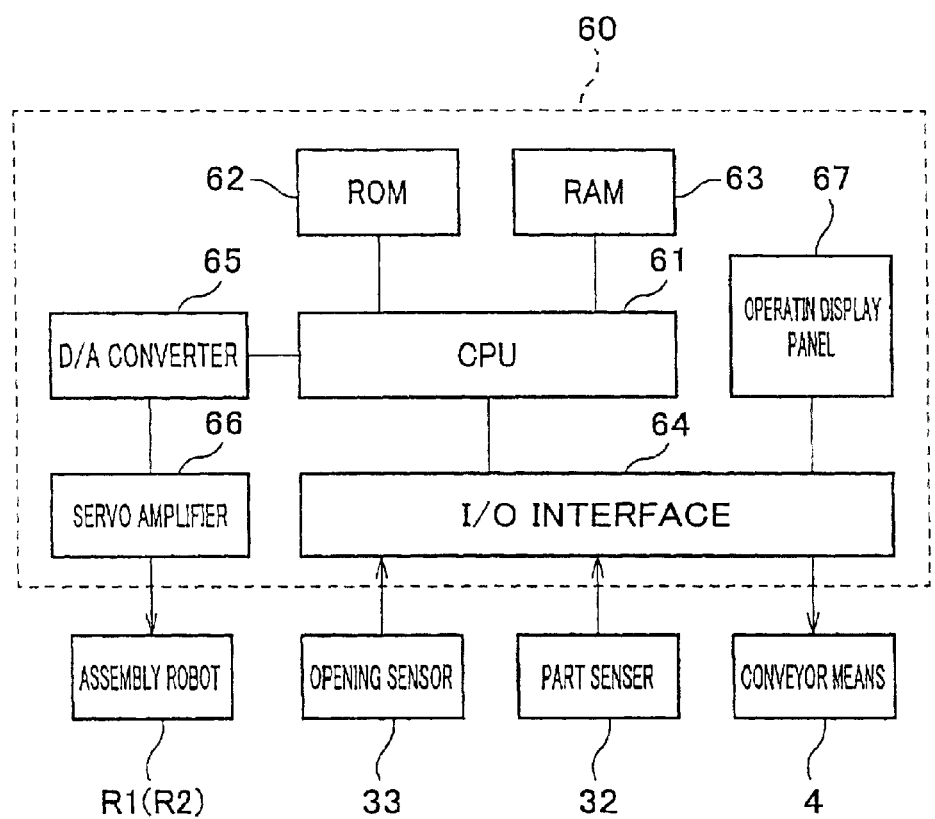
FIG. 12 is a system configuration chart showing one example of a controller.

Next a description will be given of the controller 60 of the assembly apparatus 1 as shown in FIG. 11. FIG. 12 is a system configuration chart showing one example of the controller 60 for controlling the assembly apparatus 1.

The controller 60 includes a CPU (Central Processing Unit) 61 that mainly performs operations of writing/reading data, calculating, and the like, to which connected are: a ROM (Read Only Memory) 62 in which basic operations of the assembly robots R1, R2 are recorded; a RAM (Random Access Memory) 63 that temporarily stores programs created by a user of the assembly apparatus 1 to implement operations of the assembly robots R1, R2, or the like; an I/O (Input/Output) interface 64 through which information is transmitted to and received from an external device; and a D/A converter 65 that converts instructions issued by the CPU 61 to the assembly robots R1, R2 in the form of a digital signal into an analog form. The D/A converter 65 is connected with a servo amplifier 66, from which power is supplied to the assembly robots R1, R2. To the I/O interface 64 is connected an operation display panel 67 for operating the controller 60. The controller 60 is comprised of the above-enumerated components from the CPU 61 through the operation display panel 67.

The part sensor 32 and the opening sensor 33 are connected to the I/O interface 64, and signals from these sensors are input through the I/O interface 64 to the controller 60. Signals as instructions to perform or stop conveyance or the like are transmitted through the I/O interface 64 to the conveyor means 4.

<Operation of the Assembly Apparatus>

The assembly apparatus 1 constructed as described above is generally used and actuated as follows.

First, the operator 8 as shown in FIG. 11 sets, in sequence, a lower half 6, an upper half 7, and each internal part taken out from the parts boxes 22 into the conveyor pallet 5 that has been conveyed and stopped at a predetermined position in front of the operator 8. Having confirmed that these seven parts have been set, the operator 8 operates the operation switch 23, and let the conveyor pallet 5 goes to the next step.

The conveyor pallet 5 is conveyed, via the roller conveyor 41, to a position in front of the assembly robot R1 in the part-assembling station 3. The assembly robot R1 mounts in the lower half 6 five parts picked up from the conveyor pallet 5 conveyed to the work area A1 of the assembly robot R1. After completion of predetermined assembly operations of the assembly robot R1, the conveyor pallet 5 is conveyed via the roller conveyor 41 to the work area A2 of the assembly robot R2.

The assembly robot R2 initiates an operation before the conveyor pallet 5 has arrived at the work area A2. To be more specific, the assembly robot R2 begins operating immediately after completion of the assembly operation of the preceding magnetic tape cartridge, and holds and picks up one part from the part-supplying device 10. This operation of the assembly robot R2 may preferably be timed so that the part is held and moved to a position above the work area A2 before the next conveyor pallet 5 is conveyed to the work area A2, thus waiting for the conveyor pallet 5 to get positioned at the work area A2.

When the conveyor pallet 5 stops at the work area A2, and is properly positioned, the assembly robot R2 mounts the holding part in the lower half 6, then picks up the remaining two parts from the conveyor pallet 5 and mounts these parts in the lower half 6, further holds and lifts a work assembled with the upper half 7 put on the lower half 6 from the conveyor pallet 5, and moves the work onto the conveyor 31 connected to the next step. The conveyor pallet 5 after completion of the assembly operation of the assembly robot R2 is conveyed on the roller conveyor 41 shaped like a loop, and stops in front of the operator 8 again to be reused for an assembly operation of the next magnetic tape cartridge.

<Abnormal Assembly Condition Handling Process>

Next a description will be given of an abnormal assembly condition handling process in the assembly apparatus 1 as shown in FIG. 11 in which operations performed by assembly robots and manual operations performed by human operators are combined.

Figure 13A:
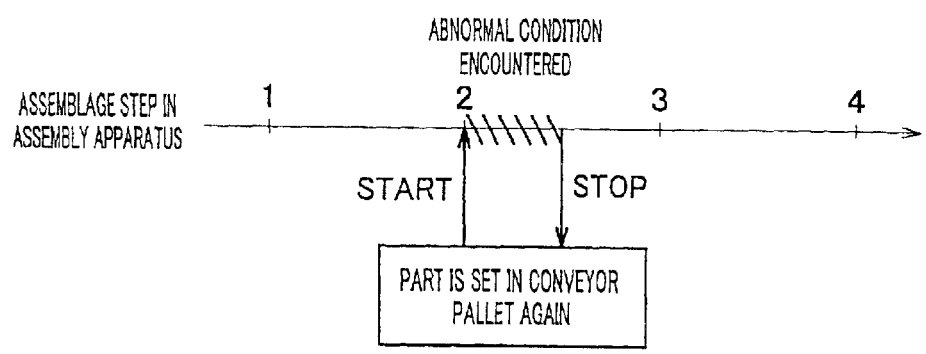
FIG. 13A is a process flowchart showing an outline of an abnormal assembly condition handling process according to a fifth embodiment of the present invention.

FIG. 13A is a process flowchart showing an outline of the abnormal assembly condition handling process according to the fifth embodiment of the present invention.

As shown in FIG. 13A, it is understood that the assembly robots R1, R2 performing the assembly operation for each part in the assembly apparatus 1 follow the assembly steps 1, 2, . . . , in sequence. If the assembly robots R1, R2 fail to assemble a work during the assembly step 2, the assembly apparatus 1 is suspended when the abnormal work is detected. Subsequently, the operator 8 sets the part failed to be mounted in the assembly step 2 in the conveyor pallet 5 again, and restarts (powers on) the assembly apparatus 1. The work in which the abnormal assembly condition has been encountered will be finished by restarting assembly operations from the assembly step 2 in which the abnormal condition has occurred so that the assembly robots R1, R2 may try again to mount the failed part.

As described above, where the assembly robots R1, R2 have failed to assemble a part, and the part may be mounted appropriately by making a retry, the failed part is put back onto the conveyor pallet 5, and the assembly operations are performed from the same assembly step by the assembly robots R1, R2. Accordingly, the assembly operations may always be performed by the assembly robots R1, R2, and no wasted part may be produced; thus the yields of the product may be increased.

[Sixth Embodiment]

Next, a sixth embodiment of the present invention will be described below. The sixth embodiment is a variation of the fifth embodiment of the abnormal condition handling process.

Figure 13B:
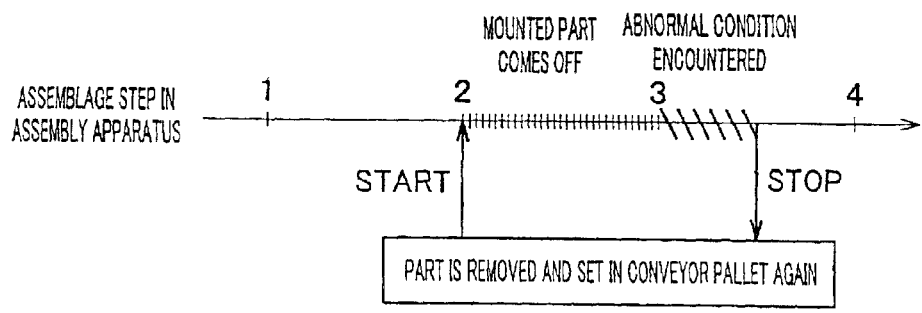
FIG. 13B is a process flowchart showing an outline of an abnormal assembly condition handling process according to a sixth embodiment of the present invention.

FIG. 13B is a process flowchart showing an outline of an abnormal assembly condition handling process according to the sixth embodiment of the present invention. As shown in FIG. 13B, it is understood that the assembly robots R1, R2 performing the assembly operation for each part in the assembly apparatus 1 follow the assembly steps 1, 2, ..., in sequence. If the assembly robots R1, R2 fail to assemble a work, for example, during the assembly step 3, causing some parts that have already been mounted normally in the assembly step 2 to come off, first, the assembly apparatus 1 is suspended at the time when the abnormal condition is encountered. Then, the part mounted in the assembly step 2 is removed, and set again, together with the part that has failed to be assembled in the assembly step 3, in the conveyor pallet 5; thereafter the assembly apparatus 1 is restarted (powered on). In short, the assembly apparatus 1 restarts the assembly operations from the assembly step 2 on which the abnormal assembly condition has retroactively had detrimental effect, and thus the parts the assembly robots R1, R2 have failed to mount are mounted again to finish the work.

As described above, if the assembly robots R1, R2 fail to mount a part, with the result that already mounted parts come off, the abnormal conditions affect upstream to previous steps. Accordingly, the parts that have failed to be assembled including the parts that have come off are put back onto the conveyor pallet 5, and the assembly operations are performed again by the assembly robots R1, R2 from the assembly step which the abnormal condition has affected retroactively. Consequently, the assembly operations may always be performed by the assembly robots R1, R2, and no wasted part may be produced; thus the yields of the product may be increased.

When an abnormal condition is encountered in the assembly step 3, there is a possibility that another conveyor pallet 5 is in the process of the assembly step 2. These circumstances would make it difficult to insert the conveyor pallet 5 that has failed to complete the assembly operations into the assembly step 2. Thus, after the parts that has come off, or the like are set again in the conveyor pallet 5, the conveyor pallet 5 may be conveyed on the roller conveyor 41 with assembly operations by the assembly robots R1, R2 skipped, let go past the part-supplying station 2, and conveyed to the part-assembling station 3 again, so that the work may be reassembled from the assembly step 2. In that instance, for example, the assembly robot R1 may be controlled to perform an assembly operation for parts that have not been mounted, after checking via the part sensor 32 whether each part has been mounted in a predetermined position, when the conveyor pallet 5 in which parts are to be reassembled is conveyed to the work area A1.

[Seventh Embodiment]

Next, a seventh embodiment of the present invention will be described below. In the seventh embodiment, a description will be given more specifically of a flow of the assembly operation and abnormal assembly condition handling process in the assembly apparatus 1 according to the fifth embodiment.

Figure 14:
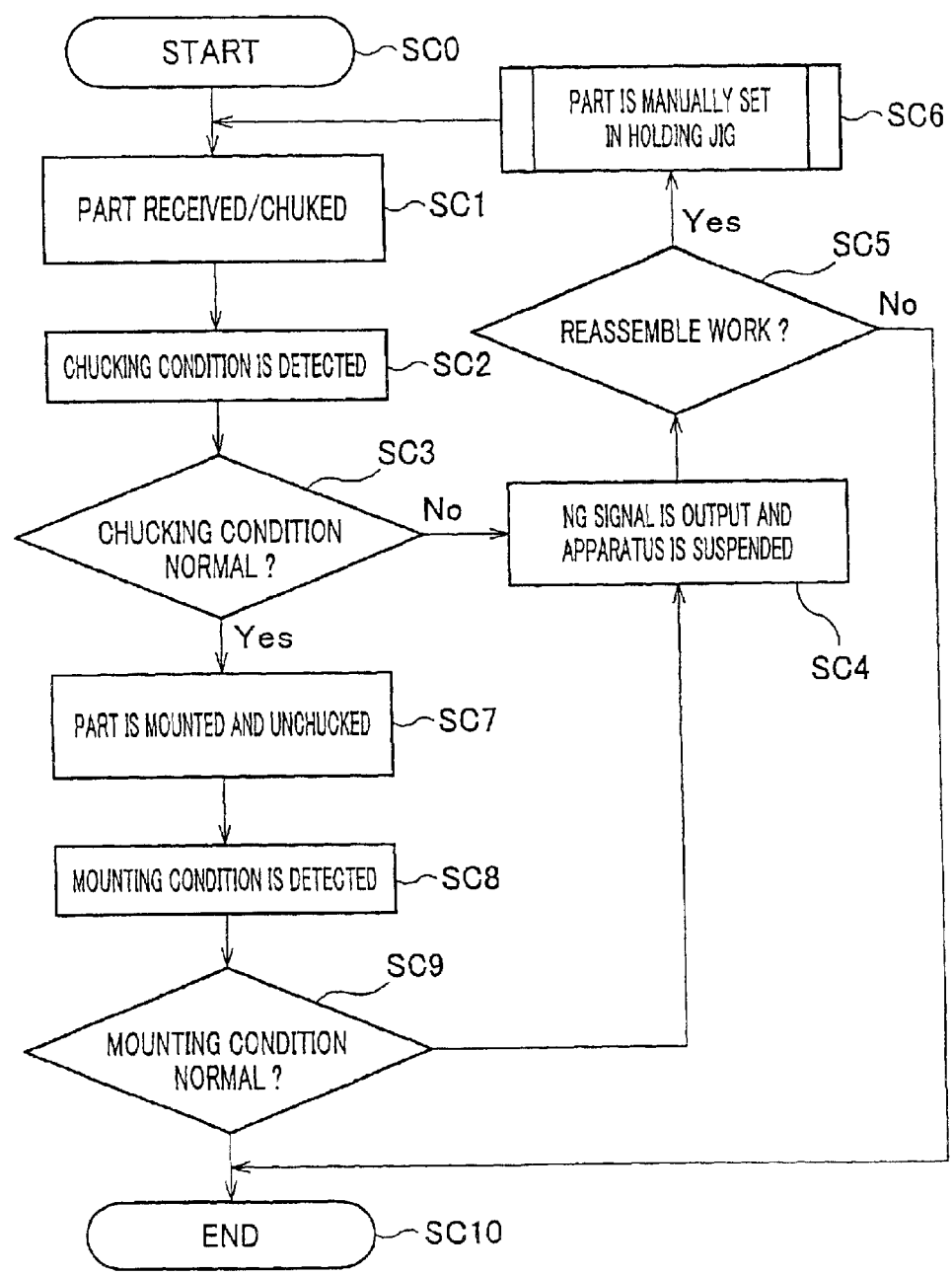
FIG. 14 is a flowchart showing an assembly operation for assembly steps according to a seventh embodiment of the present invention.

FIG. 14 is a flowchart showing assembly steps for mounting a part in the work areas of the assembly robots R1, R2. When predetermined parts are set on the conveyor pallet 5 in the part-supplying station 2, and the conveyor pallet 5 is conveyed via the roller conveyor 41 to the work area A1, the process starts in step SC0 as shown in FIG. 14. The assembly robot R1 chucks a part on the conveyor pallet 5 (step SC1), dimensions of the part chucked by the robot hand H are detected by the opening sensor 33 (step SC2). The assembly robot R2 may receive a part from the part-supplying device 10 installed beside the assembly robot R2 in some instances (step SC1), the dimensions of the part received by the robot hand H are detected as well by the opening sensor 33 (step SC2). A detection signal from the opening sensor 33 is input to the controller 60, and is compared with the dimensions of the part to be chucked that are stored in the controller 60 in advance to determine whether the detected dimensions fall within specified allowable ranges of the part to be chucked, i.e., whether the chucking condition is normal or not (step SC3).

If it is determined that the chucking condition is not normal, the controller 60 outputs an NG signal to the assembly robots R1, R2, and the conveyor means 4, and stops the assembly apparatus 1 (step SC4). Thereafter, the operator 8 goes to see the assembly robot R1, or the like, checks the chucking condition, and determines whether to reassemble the work (step SC5). For example, if the robot hand H simply fails to pick up the part, or otherwise, where no detrimental effect shows up on reassembling the part, the part is set in a predetermined holding jig on the conveyor pallet 5 (step SC6), and the steps from step SC1 are performed again. On the other hand, if it is determined that reassembling of the part is difficult for some reason, the assembly operation in the assembly step is complete (step SC 10), and the process goes back to a step that has not suffered from the abnormal condition to restart assembling (not shown).

If it is determined in step SC3 that the chucking condition is normal, the part is mounted, and the robot hand is released to unchuck the part (step SC7). Next, the part sensor 32 detects a position of the part on the conveyor pallet 5, and the detection result is input to the controller 60 (step SC8). The controller 60 determines whether the mounting condition is normal or not, by comparing the detected position of the part with prerecorded information on the position of the mounted part (step SC9).

If it is determined that the mounting condition is not normal, the controller 60 outputs an NG signal to the assembly robots R1, R2, and the conveyor means 4, and stops the assembly apparatus 1 (step SC4). Thereafter, the operator 8 goes to the assembly robot R1, and checks the mounting condition of the part to determine whether the assembly operation should be restarted immediately. When only the part that has mounted in a preceding assembly step fails to be mounted normally, the work may be reassembled at once; thus, the part that has failed to be mounted is removed and set in a predetermined holding jig on the conveyor pallet 5 again, and the assembly operation is restarted from step SC1. On the other hand, if some parts that have already been mounted in a preceding assembly step also have come off at the same time, or some parts have been broken, or otherwise, where it is difficult to restart the assembly operation immediately, the assembly operation is concluded (step SC10).

If it is determined in step SC9 that the mounting condition is normal, the assembly operation is concluded (step SC10).

According to the abnormal assembly condition handling process as described above, when an abnormal condition is encountered, the apparatus is suspended. and if the work may be reassembled as is, the assembly step is restarted from step SC1 immediately, while on the other hand if it is difficult to reassemble the work, the assembly operation is concluded at the moment, and the process goes back to the preceding step, from which the assembly operation is restarted. Consequently, human errors in the assembly operations may be prevented, while securing the yields of the product.

[Eighth Embodiment]

Next, an eighth embodiment of the present invention will be described below. In the eighth embodiment, a description will be given of a variation of the seventh embodiment in which a step of checking parts on the conveyor pallet 5 before the assembly robots R1, R2 initiate the assembly operations is added. Addition of such a step would allow the assembly apparatus 1 to reassemble a work when the work that has been assembled halfway but failed and unable to be complete through a reassembling operation as a result of an abnormal condition is put into the assembly apparatus 1 again. In the eighth embodiment, the same components as in the seventh embodiment are designated by the same reference numerals, and a detailed description will be omitted.

Figure 15:
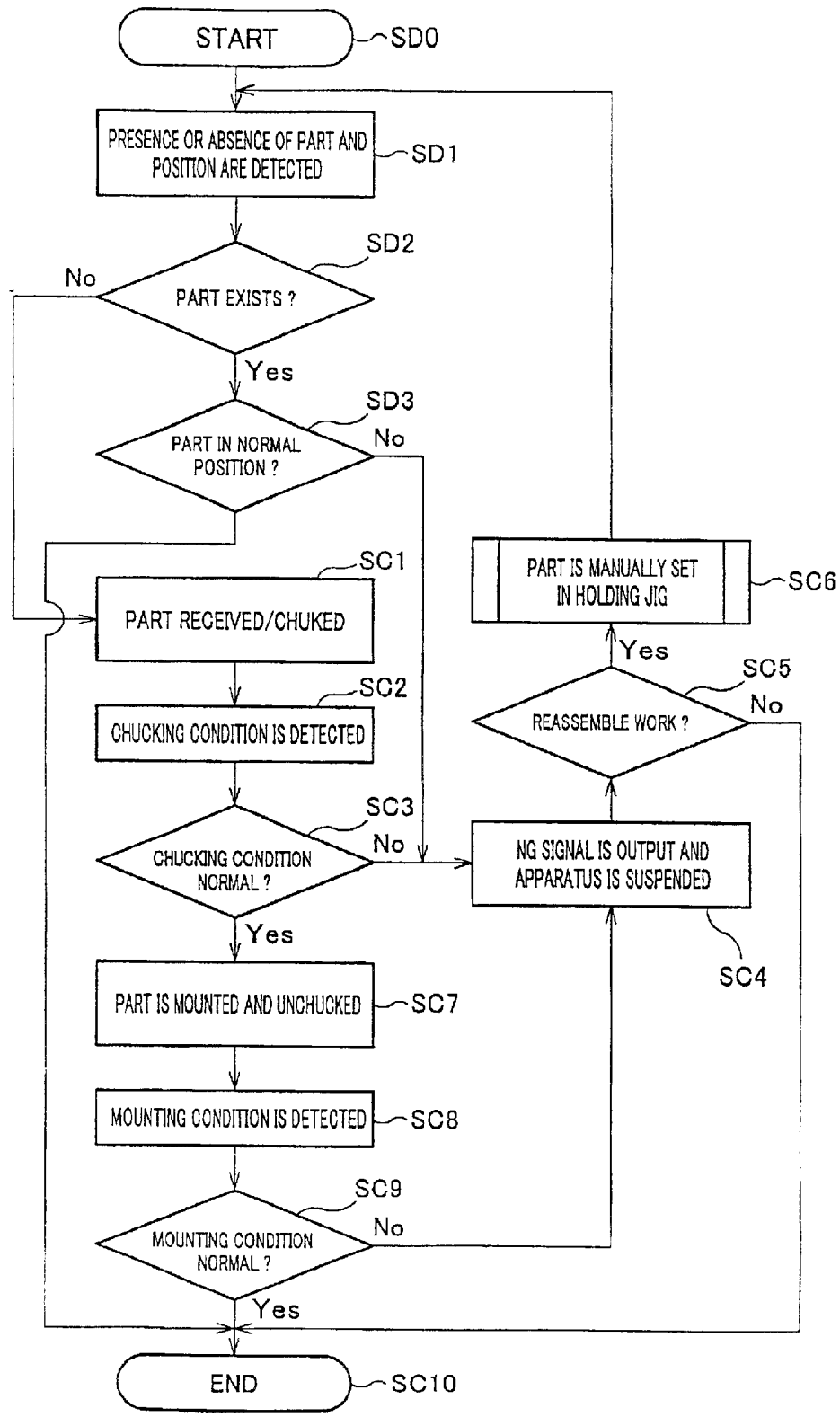
FIG. 15 is a flowchart showing an assembly operation for assembly steps according to a eighth embodiment of the present invention.
Figure 16A:
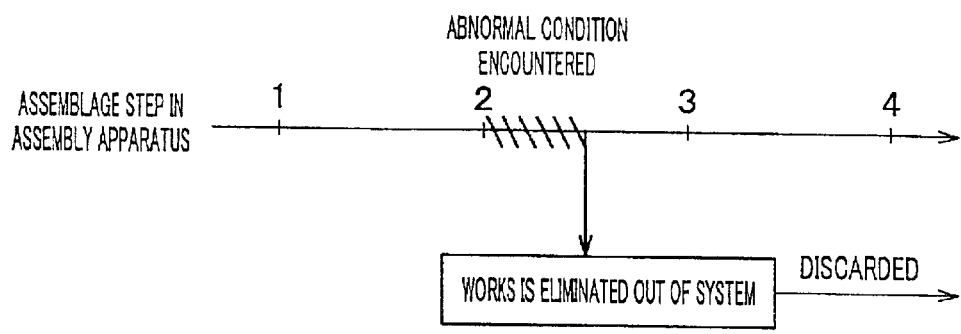
FIG. 16A is a process flowchart showing a conventional example of an abnormal assembly condition handling process.
Figure 16B:
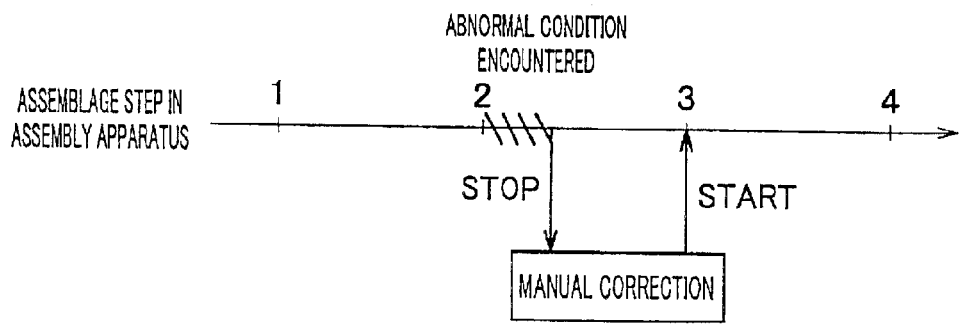
FIG. 16B is a process flowchart showing another conventional example of an abnormal assembly condition handling process.

FIG. 15 is a flowchart showing a step of assembling a part in the work areas of the assembly robots R1, R2. When the conveyor pallet 5 on which predetermined parts are set in the part-supplying station 2, or the conveyor pallet 5 on which a work having assembled halfway but failed and unable to be complete through a reassembling operation due to an abnormal condition is put into the assembly line again, and conveyed to the work area A1 via the roller conveyor 41, the process starts in step SD0 as shown in FIG. 15.

First, in the work area A1, the part sensor 32 detects the presence or absence of a part having been already mounted on the conveyor pallet 5, or a position of the part (step SD1). Since the detection of the position or the like of the part is conducted by measuring a distance between the part and the part sensor 32, the position and the presence or absence of the part may be detected at the same time. The detected information on the position or the like of the part is input to the controller 60, and the controller 60 determines whether the part exists in a mounting position, i.e., whether the part has already been mounted in the mounting position (step SD2).

If the part does not exist in the mounting position, as the part has not been mounted yet, it is determined that a normal assembly operation is to be performed. Therefore, as in the seventh embodiment, the process proceeds to the operation step of the assembly robot R1 picking up and chucking a part from the conveyor pallet 5 (step SC1), and the subsequent steps through SC 10 are carried out.

On the other hand, if it is determined in step SD2 that the part exists, then the controller 60 determines whether the part having already been mounted is in a normal position (step SD3).

If it is determined that the position of the part is normal, the assembly step need not be performed, and thus the assembly step is concluded (step SC10).

On the other hand, if it is determined in step SD3 that the position of the part is not normal, the controller 60 outputs an NG signal to the assembly robots R1, R2, and the conveyor means 4, and suspends the assembly apparatus 1 (step SC4). Thereafter, the operator 8 goes to see the assembly robot R1 or the like, and checks the chucking condition to determine whether to reassemble the work (step SC5). For example, if the part happens to simply come off, or otherwise, where no detrimental effect shows up on reassembling the part, the part is set in a predetermined holding jig on the conveyor pallet 5 (step SC6), and the steps are performed again from step SC1. On the other hand, if it is determined that reassembling of the part is difficult due to breakage of the part or the like, the assembly operation in the assembly step is concluded (step SC 10), and the process goes back to a step that has not suffered from the abnormal condition to restart assembling (not shown).

According to the abnormal assembly condition handling process as described above, even if an abnormal condition is encountered, making it difficult to reassemble a part, and a work having been assembled halfway is put in the assembly apparatus 1 again, it is first determined whether a part to be mounted in the assembly step has already been mounted (step SD2), and thus the assembly robots R1, R2 may be allowed to perform a normal assembly operation irrespective of whether the part has been mounted halfway. In addition, if a position of a part that has already been mounted is not normal, it is determined that an abnormal condition is encountered (step SD3), and an abnormal condition handling process (from step SC4 through step SC6) is performed. Consequently, the yields of the product may be kept at a high level, and an error in assembling operations may be prevented from cropping up.

Moreover, as in the seventh embodiment, when an abnormal condition is encountered, the apparatus is suspended, and if a work may be reassembled, the assembly operation restarts immediately from step SC1, while if it is difficult to reassemble the work, the assembly step is concluded, and the assembly operation restarts from a preceding assembly step, whereby the yields of the product may be secured, and human errors in assembly operations may be prevented.

Although the fifth through eighth embodiments of the present invention have been described above, the present invention is not limited to these embodiments, and it is understood that various modifications and changes may be made in the present invention without departing from the spirit and scope thereof.

As described above, according to the present invention, in an assembly apparatus in which a human operator supplies parts, and an assembly robot assembles the parts, a net serviceability ratio of the assembly robot may be increased. As a result, the assembly apparatus may conform to increase in production volume without unnecessary addition of costly assembly robots or other investments in equipment.

What is claimed is:

1. An assembly apparatus comprising:
   a part-supplying station in which parts are supplied to a predetermined conveyor pallet through a manual operation;
   a part-assembling station in which the parts in the conveyor pallet are assembled through an operation using an assembly robot; and
   a conveyor means that conveys the conveyor pallet from the part-supplying station to the part-assembling station,
   wherein after the assembly robot finishes assembling parts in one conveyor pallet in a work area of the assembly robot, the conveyor means conveys out the one conveyor pallet from the work area, and conveys another conveyor pallet subsequent to the one conveyor pallet into the work area at the same time;
   wherein the conveyor pallet comprises:
   a shock-absorbing member configured to receive a stopper that projects from below the conveyor pallet when the conveyor pallet arrives at the work area; and
   a clearance groove formed at a bottom of the conveyor pallet; and wherein the clearance groove is configured to allow the stopper to project from below the conveyor pallet immediately after the shock-absorbing member passes over the stopper.

2. The assembly apparatus as claimed in claim 1, wherein, if one of the parts is incorrectly oriented, the assembly robot is configured to correct the incorrect orientation of the part based upon a signal indicating detection of the incorrect orientation of the part.

3. The assembly apparatus as claimed in claim 1 wherein the assembly robot comprises:

a gripper portion that holds each part to be assembled;

a dimensions measuring means that measures dimensions of the part held by the gripper portion; and a part-identifying means that determines whether the part is a target part to be mounted, based upon the dimensions of the part measured by the dimensions measuring means.

4. The assembly apparatus claimed in claim 1, wherein, when an abnormal condition in assembling the parts by the assembly robot takes place in an assembly step, the assembly apparatus is suspended, and assembly of the parts is restarted from the assembly step at which the abnormal condition has taken place.

5. The assembly apparatus as claimed in claim 4, wherein, when the assembly robot fails to assemble one of the parts, the one of the parts is places back onto the conveyor pallet and the assembly robot is configured to attempt to again assemble the one of the parts.

6. An assembly apparatus comprising:

a part-supplying station in which parts are supplied to a predetermined conveyor pallet through a manual operation;

a part-assembling station in which the parts in the conveyor pallet are assembled through an operation using an assembly robot; and a conveyor means that conveys the conveyor pellet from the part-supplying station to the part-assembling station, wherein the part-assembling station includes a part-supplying means that supplies some of the parts to the assembly robot for assembling the parts;

wherein the assembly robot receives the some the parts from the part-supplying means during a period for which the conveyor means conveys the conveyor pallet;

wherein the conveyor pallet comprises:

a shock-absorbing member configured to receive a stopper that projects from below the conveyor pallet when the conveyor pallet arrives at a work area of the assembly robot; and a clearance groove formed at a bottom of the conveyor pallet; and wherein the clearance groove is configured to allow the stopper to project from below the conveyor pallet immediately after the shock-absorbing member passes over the stopper.

* * * * *